United States Patent
Imai et al.

(10) Patent No.: US 12,537,903 B2
(45) Date of Patent: Jan. 27, 2026

(54) INSPECTION SYSTEM, INSPECTION APPARATUS AND METHOD OF CONTROLLING THE SAME THAT ALLOWS AN INSTRUCTION TO RE-DIAGNOSE A PRINTING APPARATUS

(71) Applicant: CANON KABUSHIKI KAISHA, Tokyo (JP)

(72) Inventors: Seijiro Imai, Ibaraki (JP); Takeshi Okada, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 18/467,003

(22) Filed: Sep. 14, 2023

(65) Prior Publication Data

US 2024/0114096 A1    Apr. 4, 2024

(30) Foreign Application Priority Data

Sep. 29, 2022  (JP) ................................. 2022-156464

(51) Int. Cl.
*H04N 1/00*       (2006.01)
*G06T 7/00*       (2017.01)

(52) U.S. Cl.
CPC ....... *H04N 1/00029* (2013.01); *G06T 7/0002* (2013.01); *H04N 1/00045* (2013.01); *H04N 1/00082* (2013.01); *G06T 2207/30144* (2013.01)

(58) Field of Classification Search
CPC .......... H04N 1/00029; H04N 1/00045; H04N 1/00082; G06T 7/0002; G06T 2207/30144; G06T 2207/30168
See application file for complete search history.

(56) References Cited

U.S. PATENT DOCUMENTS

| 6,665,425 B1* | 12/2003 | Sampath | G03G 15/5079 358/1.15 |
| 2001/0016054 A1* | 8/2001 | Banker | H04N 1/00015 382/112 |
| 2019/0281171 A1* | 9/2019 | Hayashi | H04N 1/00045 |

FOREIGN PATENT DOCUMENTS

| JP | 2017009837 A | 1/2017 |
| JP | 2019200306 A | 11/2019 |

* cited by examiner

*Primary Examiner* — Kent Yip
(74) *Attorney, Agent, or Firm* — ROSSI, KIMMS & McDOWELL LLP

(57) ABSTRACT

The present invention provides an inspection system comprising a printing apparatus and an inspection apparatus that inspects a printed matter printed by the printing apparatus. The inspection apparatus obtains a scanned image by reading an image formed on the printed matter, diagnose the printing apparatus based on the scanned image, and in a case in which the printing apparatus is diagnosed as having a defect by the diagnosis, the inspection apparatus presents a countermeasure to be executed in the printing apparatus to resolve the defect. Then, in response to the execution of the countermeasure in the printing apparatus, the inspection apparatus allows an instruction to re-diagnose the printing apparatus to be accepted.

17 Claims, 16 Drawing Sheets

FIG. 4

400 — IMAGE DIAGNOSIS SETTING

| 401 DISPLACEMENT | 402 BLEMISH (STREAK) | 403 BLEMISH (SPOT) |
|---|---|---|
| ☑ DIAGNOSE | ☑ DIAGNOSE | ☑ DIAGNOSE |
| DO NOT | DO NOT | DO NOT |
| TARGET COLOR | TARGET COLOR | TARGET COLOR |
| ☑ Y | ☑ Y | ☑ Y |
| ☑ M | ☑ M | ☑ M |
| ☑ C | ☑ C | ☑ C |
| ☑ K | ☑ K | ☑ K |

404 — RESET SETTINGS

405 — SHEET SETTING | FEEDING DECK 301: A4

406 — EXECUTE IMAGE DIAGNOSIS

407 — CLOSE

FIG. 5B

IMAGE DIAGNOSIS RESULTS

501

| DIAGNOSIS ITEM · RESULT | |
|---|---|
| DISPLACEMENT | |
| VERTICAL | : AUTOMATIC COUNTERMEASURE |
| HORIZONTAL | : AUTOMATIC COUNTERMEASURE |
| BLEMISH (STREAK) | |
| VERTICAL STREAK | : ABNORMALITY |
| HORIZONTAL STREAK | : NORMAL |
| BLEMISH (SPOT) | |
| WHITE SPOT | : NORMAL |
| COLOR SPOT | : NORMAL |
| BLACK MOTTLING | : NORMAL |
| WHITE MOTTLING | : NORMAL |

502

DIAGNOSIS RESULT: ABNORMALITY;
DISPLACEMENT (VERTICAL, HORIZONTAL) IS OCCURRING;

VERTICAL STREAK IS OCCURRING

AUTOMATIC RESOLUTION:
EXECUTED THE FOLLOWING COUNTERMEASURE AUTOMATICALLY
· REGISTRATION ADJUSTMENT

COUNTERMEASURE:
PLEASE REPLACE THE FOLLOWING PARTS
· DRUM UNIT (C)
· DRUM UNIT (K)

511 NEXT

503 CLOSE

510

F I G. 11B

INSPECTION RESULT CONFIRMATION SCREEN

| 1ST SIDE | | 80 SHEETS | | 2 SHEETS | | 0 SHEETS | |
|---|---|---|---|---|---|---|---|
| | | DISPLACEMENT (VERTICAL): 0 | | DISPLACEMENT (HORIZONTAL): 0 | | BLEMISH (SPOT): 0 | BLEMISH (STREAK): 2 |

2ND SIDE

NG LIST:

| No. | SHEET No. | COPIES No. | SIDE No. | DISPLACEMENT (VERTICAL) | DISPLACEMENT (HORIZONTAL) | BLEMISH (SPOT) | BLEMISH (STREAK) | ERROR | EXAMINATION DATE | NG IMAGE |
|---|---|---|---|---|---|---|---|---|---|---|
| 72 | 2 | 15 | 1 | OK | OK | OK | NG | — | 2022/5/24 15:04 | CHECK |
| 78 | 3 | 16 | 1 | OK | OK | OK | NG | — | 2022/5/24 15:05 | CHECK |

EXECUTE IMAGE DIAGNOSIS

CLOSE

DISPLAYED SHEET: SHEET 1/2

FIG. 12

| PART NAME | IMAGE DIAGNOSIS ITEM TO PERFORM |
|---|---|
| DEVELOPMENT SLEEVE | BLEMISH (STREAK) |
| DRUM | DISPLACEMENT, BLEMISH (STREAK), BLEMISH (SPOT) |
| FIXING UNIT | BLEMISH (STREAK), BLEMISH (SPOT) |
| DEVELOPER | BLEMISH (STREAK), BLEMISH (SPOT) |
| ITB UNIT | DISPLACEMENT, BLEMISH (STREAK), BLEMISH (SPOT) |
| DUSTPROOF GLASS | BLEMISH (STREAK) |
| READOUT DEVICE CCD | BLEMISH (STREAK) |
| INTERNAL ROLLER | BLEMISH (STREAK), BLEMISH (SPOT) |
| EXTERNAL ROLLER | BLEMISH (STREAK), BLEMISH (SPOT) |
| EXTERNAL BELT | BLEMISH (STREAK), BLEMISH (SPOT) |

FIG. 13

RECOMMENDING IMAGE DIAGNOSIS BEFORE EXECUTING JOB WHEN PART MAINTENANCE HAS BEEN PERFORMED

PART FOR WHICH MAINTENANCE WAS PERFORMED: FIXING UNIT

RECOMMENDED DIAGNOSIS ITEM: BLEMISH (STREAK), BLEMISH (SPOT)

[EXECUTE IMMEDIATELY]　[CLOSE]

INSPECTION SYSTEM, INSPECTION APPARATUS AND METHOD OF CONTROLLING THE SAME THAT ALLOWS AN INSTRUCTION TO RE-DIAGNOSE A PRINTING APPARATUS

BACKGROUND OF THE INVENTION

Field of the Invention

The present invention relates to an inspection system, an inspection apparatus and a method of controlling the same.

Description of the Related Art

In recent years, there has been known an inspection system that inspects the quality of an image printed on a printed matter printed and output by an image forming apparatus by reading the printed matter using a sensor, performing image processing on the obtained image data, and then performing comparison with original print data. This inspection system can detect defects (hereinafter image defects) during printing caused by skew-feed, and blemishes and blank dots in printed matters.

Such image defects may occur as a result of parts inside the image forming apparatus undergoing degradation due to, inter alia, the apparatus being used for a long period of time in a stressful way. As a countermeasure against such degradation of parts inside the apparatus, there has also been developed an image diagnosis function for identifying the types and causes of image defects by printing dedicated charts and reading the charts using a sensor.

Such an image diagnosis function is expected to be mainly installed in commercial printers the products output from which are used as merchandise. Even in such commercial printers, there is an operation mode in which the user himself/herself performs maintenance work such as the cleaning and replacement of consumable parts in the printer in order to reduce the maintenance cost of various consumable parts. If the parts on which the user performs maintenance include parts that are involved in image forming, such as photosensitive drums and developing sleeves, product quality would be affected to some extent when maintenance is performed of such parts. Thus, it is desirable that the user take the time to execute image diagnosis and confirm that there is no abnormality in diagnosis results before executing a job, such as a product-inspection job, in which product quality is of particular significance after the user has replaced a part.

In Japanese Patent Laid-Open No. 2017-9837, diagnosis processing corresponding to an image defect recognized by a user is executed, and the user is prompted to perform a countermeasure via the result of the diagnosis. Furthermore, it is described that a test chart is printed once the countermeasure is complete, and a selection is accepted as to whether or not the image defect has been resolved.

Furthermore, Japanese Patent Laid-Open No. 2019-200306 discloses a technique in which, in order to execute image diagnosis at appropriate timings, the total number of sheets of each sheet size printed by an image forming apparatus is stored, and image diagnosis is executed if the total number of sheets exceeds a predetermined number of sheets.

In the conventional image forming apparatus, the selection as to whether or not to print a test chart is accepted after completion of the countermeasure that the user is prompted to perform via the result of the diagnosis. Furthermore, if a selection to print a test chart is accepted, nothing more than the printing of the test chart is performed, and it is up to the user to visually inspect the test chart and thereby determine whether or not the image defect has been resolved. Also, in a case in which the image defect has not been resolved, the user determines what kind of image defect is occurring. Furthermore, in order to execute diagnosis using the image forming apparatus once again after completion of the countermeasure, the user needs to start from the input of the type of image defect, similarly to the previous diagnosis. Thus, there was a problem that the confirmation of whether or not the image defect has been resolved after completion of the countermeasure cannot be performed efficiently because many operations need to be performed in order to execute diagnosis after completion of the countermeasure.

In addition, the following situation is also conceivable; in a case in which a user judges that a failure has been resolved by replacing a part by maintenance work, products are affected due to the occurrence of an unexpected failure or the like caused by an initial failure of the replaced part or the like. Should the user execute a job in which product quality is of particular significance without confirming the influence of the maintenance work on products in such a case, products without satisfactory quality may be mass-produced.

SUMMARY OF THE INVENTION

Embodiments of the present disclosure eliminate the above-mentioned issues with conventional technology.

A feature of embodiments of the present disclosure is to provide a technique for diagnosing a state of a printing apparatus by reading a printed matter and presenting to a user a countermeasure to be performed on the printing apparatus based on the result of the diagnosis, and also allowing diagnosis of the state of the printing apparatus after the countermeasure has been performed to be performed easily.

According to embodiments of the present disclosure, there is provided an inspection system comprising: a printing apparatus; and an inspection apparatus that inspects a printed matter printed by the printing apparatus, wherein the inspection apparatus includes one or more controllers including one or more processors and one or more memories, the one or more controllers configured to: obtain a scanned image by reading an image formed on the printed matter; diagnose the printing apparatus based on the scanned image; in a case in which the printing apparatus is diagnosed as having a defect by the diagnosis, present a countermeasure to be executed in the printing apparatus to resolve the defect; and in response to the execution of the countermeasure in the printing apparatus, allow an instruction to re-diagnose the printing apparatus to be accepted.

According to embodiments of the present disclosure, there is provided an inspection apparatus that inspects a printed matter printed by a printing apparatus, the inspection apparatus comprising one or more controllers including one or more processors and one or more memories, the one or more controllers configured to: obtain a scanned image by reading an image formed on the printed matter; diagnose the printing apparatus based on the scanned image; in a case in which the printing apparatus is diagnosed as having a defect by the diagnosis, present a countermeasure to be executed in the printing apparatus to resolve the defect; and in response to the execution of the countermeasure in the printing apparatus, allow an instruction to re-diagnose the printing apparatus to be accepted.

According to embodiments of the present disclosure, there is provided a method of controlling an inspection apparatus that inspects a printed matter printed by a printing apparatus, the method comprising: obtaining a scanned image by reading an image formed on the printed matter; diagnosing the printing apparatus based on the scanned image; in a case in which the printing apparatus is diagnosed as having an abnormality by the diagnosis, presenting a countermeasure to be executed in the printing apparatus to resolve the abnormality; and in response to the execution of the countermeasure in the printing apparatus, allowing an instruction to re-diagnose the printing apparatus to be accepted.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 4 depicts a view illustrating one example of an image-diagnosis setting screen displayed to provide an instruction to execute image diagnosis in the first embodiment.

FIGS. 11A and 11B depict views respectively illustrating examples of inspection-result checking screens displaying results of product-inspection processing according to a second embodiment of the present invention.

FIG. 12 is a diagram illustrating one example of a part list indicating a list of parts that are targets of image diagnosis according to the second embodiment and image-diagnosis items corresponding to the parts.

FIG. 13 depicts a view illustrating one example of an image-diagnosis recommendation screen displayed by the inspection apparatus according to the second embodiment.

DESCRIPTION OF THE EMBODIMENTS

Figure 1:
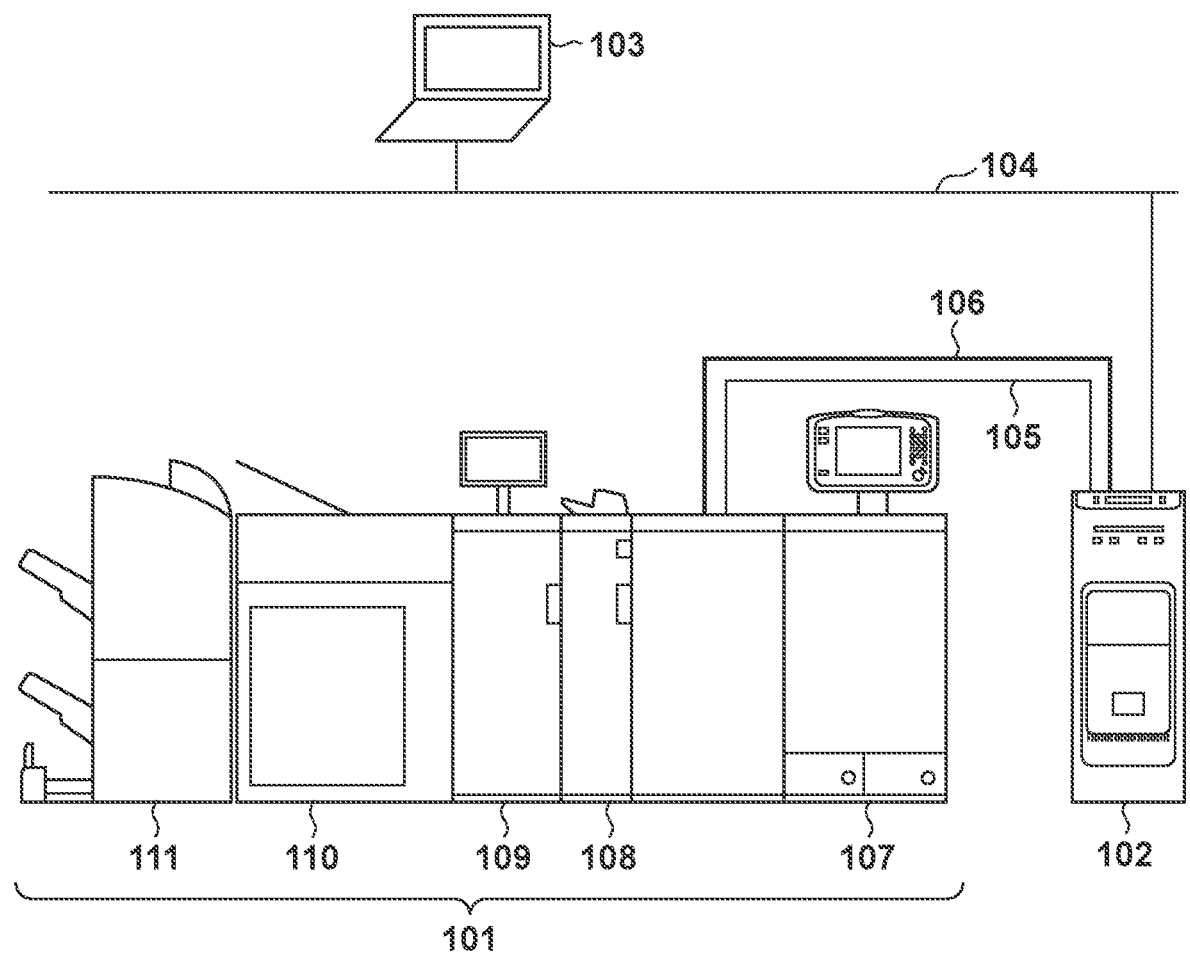
FIG. 1 is a diagram illustrating a configuration of an image processing system according to a first embodiment of the present invention.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. In the attached drawings, the same reference numerals are given to the same or similar configurations, and redundant description thereof is omitted. Note that the external controller in the following embodiments may also be called an image processing controller, a digital front end (DFE), a print server, or the like. The image forming apparatus may also be called a multi-function peripheral (MFP).

FIG. 1 is a diagram illustrating a configuration of an image processing system according to a first embodiment of the present invention.

This image processing system includes an image forming apparatus 101 and an external controller 102. The image forming apparatus 101 and the external controller 102 are connected via an internal LAN 105 and a video cable 106 so as to be capable of communicating with one another. Furthermore, the external controller 102 is connected to a PC 103 via an external LAN 104 so as to be capable of communicating with the PC 103, and print instructions are provided from the PC 103 to the external controller 102.

In this PC 103, a printer driver that has the function of converting print data into print description language that can be processed by the external controller 102 is installed. A user performing printing can provide print instructions from various applications via the printer driver. Based on a print instruction from the user, the printer driver transmits print data to the external controller 102. Upon receiving the print data from the PC 103, the external controller 102 performs data analysis and rasterization processing, and provides a print command to the image forming apparatus 101 by inputting print data to the image forming apparatus 101. The external controller 102 inputs print data to the image forming apparatus 101 via the internal LAN 105, and inputs rasterized image data to the image forming apparatus 101 via the video cable 106.

Next, the image forming apparatus 101 will be described. The image forming apparatus 101 has a plurality of apparatuses with different functions connected thereto, and is configured so as to be capable of executing print processing including complicated post-processing such as bookbinding.

A printing apparatus 107 uses toner and forms images on sheets conveyed from a feeding unit that is located in the bottom part of the printing apparatus 107. Note that, while description will be provided herein with reference to an example in which printing is performed on sheets of paper, printing media other than sheets of paper may be used.

The configuration and the principle of operation of the printing apparatus 107 are as follows. A light beam, such as laser light, modulated in accordance with image data is reflected using a rotary polygon mirror such as a polygonal mirror and emitted toward a photosensitive drum as scanning light. An electrostatic latent image formed on the photosensitive drum by this laser light is developed using toner as toner image, and the toner image is transferred onto a sheet affixed to a transfer drum. As a result of this series of image forming processes being sequentially executed for yellow (Y), magenta (M), cyan (C), and black (K) toner, a full-color image is formed on the sheet. The sheet on the transfer drum, on which the full-color image has been formed, is conveyed to a fixing unit. The fixing unit includes a roller, a belt, and the like, and has a heat source such as a halogen heater built into the roller; the fixing unit fixes the toner on the sheet having the toner image transferred thereon to the sheet by melting the toner with heat and pressure. An inserter 108 is an apparatus for inserting insertion sheets. A sheet can be inserted from the inserter 108 to a desired position in a group of sheets printed and conveyed by the printing apparatus 107.

An inspection apparatus 109 is an apparatus for determining whether or not a printed image is normal by comparing reference image data (hereinafter reference image) registered in advance and image data generated by reading an image on a conveyed sheet (printed matter). Note that, for example, printed matters that have been subjected to the determination of normal or not are discharged such that normal printed matters and printed matters with errors are separated from one another.

Furthermore, the inspection apparatus 109 also has an image diagnosis function. By comparing image data generated by reading an image of a dedicated image diagnosis chart printed on a sheet by the printing apparatus 107 and original chart image data, the inspection apparatus 109 determines the presence/absence of image defects, and, should an image defect be found, identifies the type and cause of the image defect.

A large-capacity stacker 110 is an apparatus in which a large volume of sheets can be stacked. A finisher 111 is an apparatus that applies finishing processing to sheets conveyed thereto. The finisher 111 can perform finishing processing such as stapling, punching, and saddle stitching bookbinding in accordance with settings made, and discharges sheets to sheet-discharge trays.

The system described with reference to FIG. 1 has a configuration in which the external controller 102 is connected to the image forming apparatus 101; however, the present invention is not limited to a configuration in which the external controller 102 is connected. That is, a configuration may be adopted in which the image forming apparatus 101 is connected to the external LAN 104, and print data that can be processed by the image forming apparatus 101 is transmitted from the PC 103. In this case, print processing is executed by the image forming apparatus 101 after data analysis and rasterization processing are performed in the image forming apparatus 101.

Figure 2:
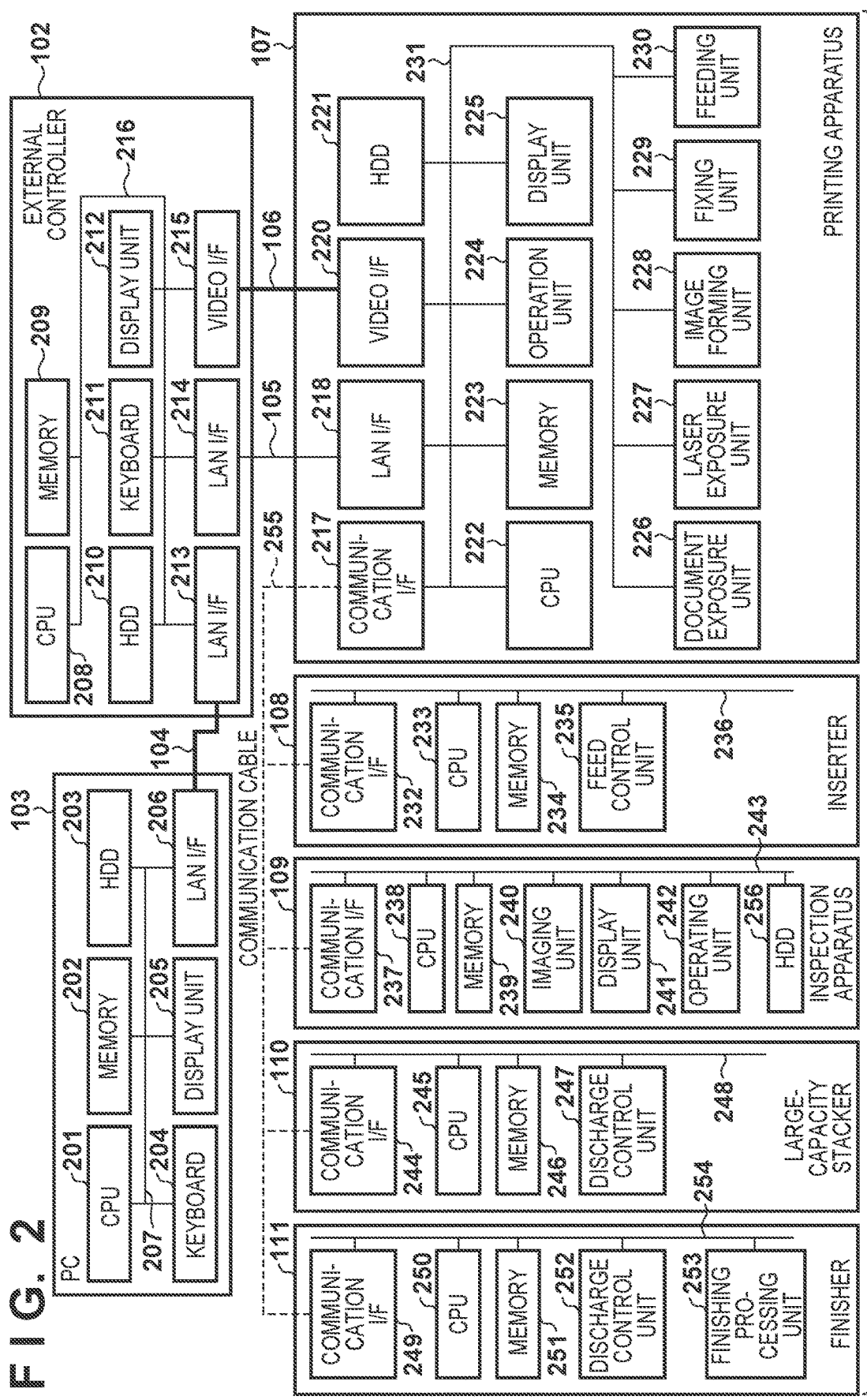
FIG. 2 is a block diagram for describing hardware configurations of an image forming apparatus, an external controller, and a PC according to the first embodiment.

FIG. 2 is a block diagram for describing hardware configurations of the image forming apparatus 101, the external controller 102, and the PC 103 according to the first embodiment.

First, a configuration of the printing apparatus 107 in the image forming apparatus 101 will be described.

The printing apparatus 107 includes a communication I/F 217, a LAN I/F 218, a video I/F 220, a hard disk drive (HDD) 221, a CPU 222, a memory 223, an operation unit 224, and a display unit 225. Furthermore, the printing apparatus 107 includes a document exposure unit 226, a laser exposure unit 227, an image forming unit 228, a fixing unit 229, and a feeding unit 230. The components are connected to one another via a system bus 231. The communication I/F 217 is connected to the inserter 108, the inspection apparatus 109, the large-capacity stacker 110, and the finisher 111 via a communication cable 255, and communication for controlling the individual apparatuses is performed via the communication I/F 217. The LAN I/F 218 is connected to the external controller 102 via the internal LAN 105, and communication of print data and the like is performed via the LAN I/F 218. The video I/F 220 is connected to the external controller 102 via the video cable 106, and communication of rasterized image data and the like is performed via the video I/F 220. The HDD 221 is a storage device in which a program and data are stored. The CPU 222 comprehensively performs image processing control and print control by deploying the program stored in the HDD 221 to the memory 223 and executing the program. The memory 223 operates as a work area and stores programs and image data and the like that are necessary when the CPU 222 performs various types of processing. The operation unit 224 accepts input of various settings and operation instructions from the user. Information about settings of the image forming apparatus 101, the processing status of print jobs, and the like are displayed on the display unit 225. The document exposure unit 226 performs processing for reading documents when the copying and scanning functions are used. The document exposure unit 226 reads document data by capturing an image using a CCD camera while irradiating a sheet positioned by the user with light from an exposure lamp.

The laser exposure unit 227 is an apparatus that performs laser exposure and primary charge for irradiating a photosensitive drum with laser light in order to transfer a toner image. In the laser exposure unit 227, first, primary charge for charging the surface of the photosensitive drum to a uniform negative potential is performed. Next, laser light is emitted to the photosensitive drum using a laser driver while adjusting the reflection angle using a polygonal mirror. Thus, the negative charge of irradiated portions is neutralized, and an electrostatic latent image is formed. The image forming unit 228 is an apparatus for transferring toner onto sheets, and includes a developing unit, a transfer unit, a toner replenishing unit, and the like; the image forming unit 228 transfers toner on the photosensitive drum onto a sheet.

In the developing unit, negatively charged toner is applied to the electrostatic latent image on the surface of the photosensitive drum from a developing cylinder to visualize the electrostatic latent image. In the transfer unit, primary transfer, in which a positive potential is applied to a primary transfer roller and the toner on the surface of the photosensitive drum is transferred onto a transfer belt, and secondary transfer, in which a positive potential is applied to a secondary transfer outer roller and the toner on the transfer belt is transferred onto a sheet, are performed. The fixing unit 229 is an apparatus for melting and fixing the toner on the sheet to the sheet with heat and pressure, and includes a heater, a fixing belt, a pressing belt, and the like. The feeding unit 230 is an apparatus for feeding sheets, and operations for feeding and conveying sheets are controlled using rollers and various types of sensors.

Next, a configuration of the inserter 108 in the image forming apparatus 101 will be described.

The inserter 108 includes a communication I/F 232, a CPU 233, a memory 234, and a feed control unit 235, and the components are connected to one another via a system bus 236. The communication I/F 232 is connected to the printing apparatus 107 via the communication cable 255, and communication that is necessary for control is performed via the communication I/F 232. The CPU 233 performs various types of control that are necessary for sheet feeding in accordance with a control program stored in the memory 234. The memory 234 is a storage device in which the control program is stored. The feed control unit 235, based on instructions from the CPU 222, controls the feeding and conveyance of sheets conveyed from the printing apparatus 107 and a feeding unit of the inserter 108 while controlling rollers and sensors.

Next, a configuration of the inspection apparatus 109 in the image forming apparatus 101 will be described.

The inspection apparatus 109 includes a communication I/F 237, a CPU 238, a memory 239, an imaging unit 240, a display unit 241, an operation unit 242, and an HDD 256, and the components are connected to one another via a system bus 243. The communication I/F 237 is connected to the printing apparatus 107 via the communication cable 255, and communication that is necessary for control is performed via the communication I/F 237. Furthermore, reference images for inspection are also received from the printing apparatus 107 via the communication cable 255 and the communication I/F 237, and are stored in the HDD 256. Chart images for image diagnosis are stored in the HDD 256 in advance. The CPU 238 performs various types of control that are necessary for product inspection and image diagnosis by executing a control program stored in the memory 239. The memory 239 is a storage device in which the control program is stored. The reference images and the chart images are not limited to being received and stored as described above; a configuration may also be adopted such that the inspection apparatus 109 includes a LAN I/F, and the inspection apparatus 109 communicates with the external controller 102 via an internal LAN, for example. In this case, the inspection apparatus 109 can operate in a similar manner by receiving the reference images and the chart images from the external controller 102 via the LAN I/F and storing the images in the HDD 256.

The imaging unit 240, based on an instruction from the CPU 238, captures an image of a sheet conveyed thereto. The CPU 238 determines whether or not the printed image is normal by comparing the image captured by the imaging unit 240 and a reference image or a chart image stored in the HDD 256. The display unit 241 is used to display product inspection results, setting screens, etc. The operation unit 242 is operated by the user, and accepts instructions to change settings of the inspection apparatus 109, register reference images, execute image diagnosis, etc. The HDD 256 stores the reference images and the chart images. Note that, in a case in which the HDD 256 is not included, the reference images and the chart images are stored in the HDD 221 of the printing apparatus 107. Furthermore, a configuration may be adopted in which, upon performing processing for determining whether or not a printed image is normal, the inspection apparatus 109 receives a reference image or a chart image from the printing apparatus 107 and uses the image by deploying the image to the memory 239.

Next, a configuration of the large-capacity stacker 110 in the image forming apparatus 101 will be described.

The large-capacity stacker 110 includes a communication I/F 244, a CPU 245, a memory 246, and a discharge control unit 247, and the components are connected to one another via a system bus 248. The communication I/F 244 is connected to the printing apparatus 107 via the communication cable 255, and communication that is necessary for control is performed via the communication I/F 244. The CPU 245 performs various types of control that are necessary for sheet discharge by executing a control program stored in the memory 246. The memory 246 is a storage device in which the control program is stored. The discharge control unit 247, based on an instruction from the CPU 245, performs control for conveying a sheet conveyed thereto to a stack tray, an escape tray, or the finisher 111, which is located downstream of the large-capacity stacker 110.

Next, a configuration of the finisher 111 in the image forming apparatus 101 will be described.

The finisher 111 includes a communication I/F 249, a CPU 250, a memory 251, a discharge control unit 252, and a finishing control unit 253, and the components are connected to one another via a system bus 254. The communication I/F 249 is connected to the printing apparatus 107 via the communication cable 255, and communication that is necessary for control is performed via the communication I/F 249. The CPU 250 performs various types of control that are necessary for finishing and sheet discharge by executing a control program stored in the memory 251. The memory 251 is a storage device in which the control program is stored. The discharge control unit 252 controls the conveyance and discharge of sheets based on instructions from the CPU 250. The finishing control unit 253, based on instructions from the CPU 250, controls finishing processing, such as stapling, punching, and saddle stitching bookbinding.

Next, a configuration of the external controller 102 will be described.

The external controller 102 includes a CPU 208, a memory 209, an HDD 210, a keyboard 211, a display unit 212, a LAN I/F 213, a LAN I/F 214, and a video I/F 215, and these components are connected to one another via a system bus 216. The CPU 208 comprehensively executes processing such as reception of print data from the PC 103, raster image processing (RIP) processing, transmission of print jobs to the image forming apparatus 101, etc., by deploying a program stored in the HDD 210 to the memory 209 and executing the program. The memory 209 operates as a work area and stores programs and data, etc., that are necessary when the CPU 208 performs various types of processing. The program and data necessary for operations such as print processing are stored in the HDD 210. The keyboard 211 is a device for inputting operation instructions to the external controller 102. Information relating to applications executed on the external controller 102, etc., are displayed on the display unit 212 by still-image and moving-image image signals. The LAN I/F 213 is connected to the PC 103 via the external LAN 104, and communication of print instructions and the like is performed via the LAN I/F 213. The LAN I/F 214 is connected to the image forming apparatus 101 via the internal LAN 105, and communication of print jobs and the like as print instructions is performed via the LAN I/F 214. The video I/F 215 is connected to the image forming apparatus 101 via the video cable 106, and communication of rasterized image data and the like is performed via the video I/F 215.

Next, a configuration of the PC 103 will be described.

The PC 103 includes a CPU 201, a memory 202, an HDD 203, a keyboard 204, a display unit 205, and a LAN I/F 206, and the components are connected to one another via a system bus 207. The CPU 201 creates print data and executes print instructions by deploying a document processing program, etc., stored in the HDD 203 to the memory 202 and executing the document processing program, etc. Furthermore, the CPU 201 comprehensively controls the devices connected to the system bus 207. The memory 202 operates as a work area and stores programs and data that are necessary when the CPU 201 performs various types of processing. Programs and data necessary for operations such as print processing are stored in the HDD 203. The keyboard 204 is a device for inputting operation instructions to the PC 103. Information relating to applications executed on the PC 103, etc., are displayed on the display unit 205 by still-image and moving-image image signals. The LAN I/F 206 is connected to the external LAN 104, and communication of print instructions and the like is performed via the LAN I/F 206.

In the description above, the external controller 102 and the image forming apparatus 101 are connected via the internal LAN 105 and the video cable 106; however, any configuration may be adopted as long as data necessary for printing can be transmitted and received, and a configuration in which only a video cable is used for connection may be adopted, for example. Furthermore, the memory 202, the memory 209, the memory 223, the memory 234, the memory 239, the memory 246, and the memory 251 may each be any storage device for holding data and programs. For example, a configuration may be adopted in which these memories are each replaced with a volatile RAM, a non-volatile ROM, a built-in HDD, an external HDD, a USB memory, or the like.

Figure 3:
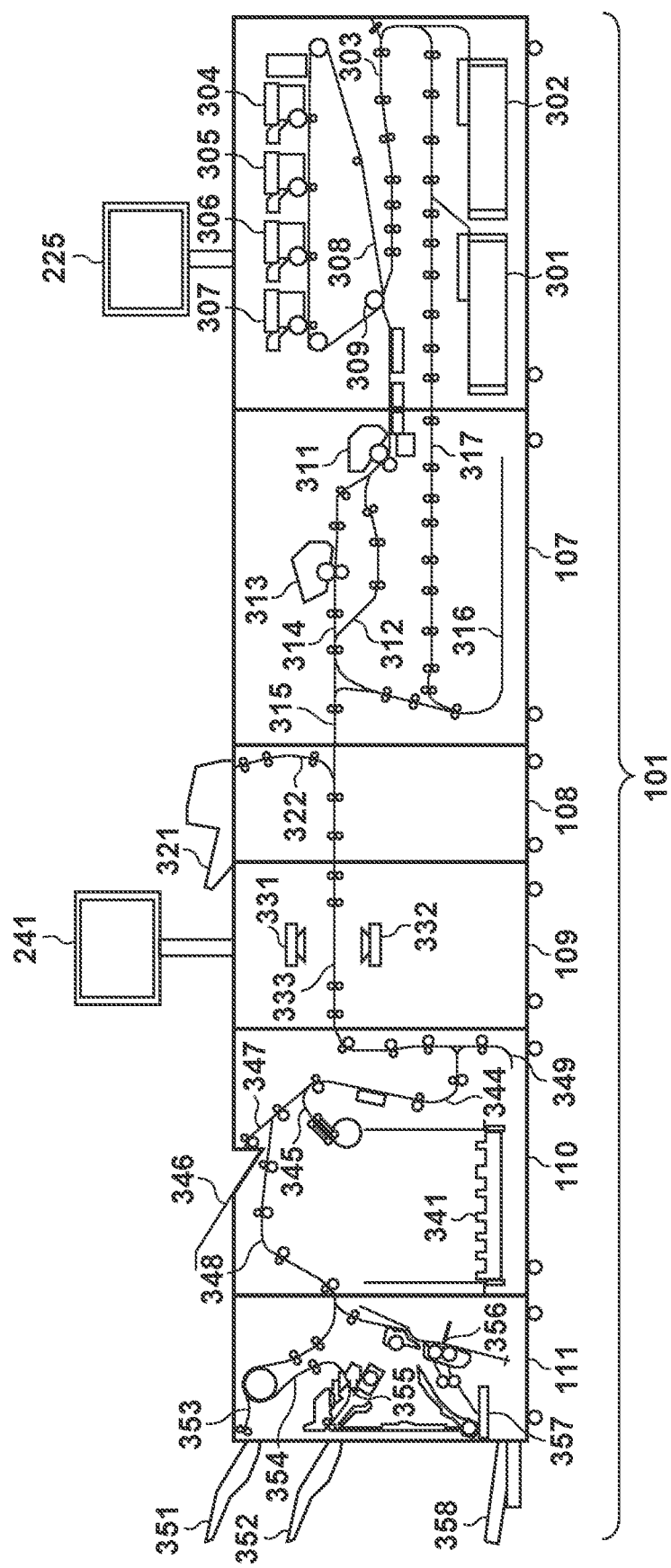
FIG. 3 is a schematic cross-sectional diagram for describing mechanisms in the image forming apparatus according to the first embodiment.

FIG. 3 is a schematic cross-sectional diagram for describing mechanisms in the image forming apparatus 101 according to the first embodiment.

First, the printing apparatus 107 will be described. Feeding decks 301 and 302 can store a plurality of sheets of various types. Information (sheet size, sheet type) of sheets stored in each feeding deck can be set from the operation unit 224 of the printing apparatus 107. Each feeding deck separates the uppermost one of the sheets housed therein and conveys the sheet onto a sheet conveyance path 303. In order to form a color image, developing stations 304, 305, 306, and 307 form toner images using colored toners of the colors Y, M, C, and K, respectively. The toner images that are formed here are primary transferred onto an intermediate transfer belt 308. The intermediate transfer belt 308 is driven to rotate in the clockwise direction in FIG. 3, and, at a secondary transfer position 309, the toner images are transferred onto a sheet that has been conveyed from the sheet conveyance path 303. The display unit 225 displays the printing status and information for setting the settings of the image forming apparatus 101. A fixing unit 311 fixes the toner images on the sheet to the sheet. The fixing unit 311 includes a pressing roller and a heating roller, and fixes the toner images to the sheet by melting and fixing the toner by pressure when the sheet having the toner images transferred thereon passes between these rollers. The sheet having passed through the fixing unit 311 is conveyed to a conveyance path 315 through a sheet conveyance path 312. Melting and fixing by pressure may need to be further performed for fixing depending on the type of sheet, and, in such a case, the sheet having passed through the fixing unit 311 is conveyed to a second fixing unit 313 via an upper sheet conveyance path. Furthermore, the sheet having been subjected to additional melting and fixing by pressure in this second fixing unit 313 is conveyed to the conveyance path 315 through a sheet conveyance path 314. Furthermore, in the case of a double-side image forming mode, the sheet having been subjected to fixing is conveyed to a double-side conveyance path 317 after being conveyed to a sheet reversing path 316 and the front and back sides of the sheet are reversed in a reversing unit 316, and an image is transferred to the second side of the sheet at the secondary transfer position 309.

Next, a configuration of the inserter 108 for inserting sheets will be described.

The inserter 108 includes an inserter tray 321, and introduces a sheet fed to the inserter tray 321 into the conveyance path via a sheet conveyance path 322. Thus, a group of a series of sheets conveyed from the printing apparatus 107 can be conveyed to the apparatus located downstream of the inserter 108 while inserting a sheet to a desired position in the group of sheets.

Next, a configuration of the inspection apparatus 109 for performing product inspection of printed sheets will be described.

A sheet having passed through the inserter 108 is conveyed to the inspection apparatus 109. In the inspection apparatus 109, cameras 331 and 332 are disposed facing one another. The cameras 331 and 332 are cameras for reading the upper and lower sides of sheets, respectively. At a timing when a sheet conveyed on a sheet conveyance path 333 arrives at a predetermined position, the inspection apparatus 109 reads images on the sheet using the cameras 331 and 332, which correspond to the imaging unit 240 in FIG. 2. For product inspection, the inspection apparatus 109 determines whether or not the images are normal; for image diagnosis, the inspection apparatus 109 determines the presence/absence of image defects, and, should an image defect be found, identifies the type and cause of the image defect. The results of the product inspection and image diagnosis performed by the inspection apparatus 109, etc., are displayed on the display unit 241.

Subsequently, a configuration of the large-capacity stacker 110, in which a large volume of sheets can be stacked, will be described.

The large-capacity stacker 110 includes a stack tray 341 as a tray for stacking sheets determined as being normal sheets (printed matters) as a result of the product inspection by the inspection apparatus 109. A sheet having passed through the inspection apparatus 109 is input to the large-capacity stacker 110 via a sheet conveyance path 344. The sheet is stacked on the stack tray 341 from the sheet conveyance path 344 via a sheet conveyance path 345. Furthermore, the large-capacity stacker 110 includes an escape tray 346 as a sheet-discharge tray. The escape tray 346 is a sheet-discharge tray for discharging chart sheets printed for image diagnosis and sheets that have been determined as being sheets (printed matters) with errors as a result of the product inspection by the inspection apparatus 109. When a sheet is to be output to the escape tray 346, the sheet is conveyed to the escape tray 346 from the sheet conveyance path 344 via a sheet conveyance path 347. Note that, in a case in which a sheet is to be conveyed to the post-processing apparatus (finisher 111) located downstream of the large-capacity stacker 110, the sheet is conveyed via a sheet conveyance path 348. A reversing unit 349 reverses sheets. This reversing unit 349 is used to stack sheets on the stack tray 341. In a case in which a sheet is to be stacked on the stack tray 341, the sheet is reversed once in the reversing unit 349 so that the direction of the input sheet and the direction of the sheet upon output are the same. In a case in which a sheet is to be conveyed to the escape tray 346 or the downstream post-processing apparatus, the reversing operation in the reversing unit 349 is not performed because the sheet is discharged directly without being flipped over upon being stacked.

Next, a configuration of the finisher 111 will be described.

The finisher 111 is an apparatus that, in accordance with a function designated by the user, applies finishing processing to sheets conveyed thereto. Specifically, the finisher 111 has finishing functions such as stapling (single stapling and double stapling), punching (two- and three-hole punching), and saddle stitch bookbinding. The finisher 111 includes a sheet-discharge tray 351 and a sheet-discharge tray 352. Sheets are output to the sheet-discharge tray 351 via a sheet conveyance path 353. However, finishing processing such as stapling cannot be performed along the sheet conveyance path 353.

In a case in which finishing processing such as stapling is to be performed, sheets are conveyed via a sheet conveyance path 354 to a processing unit 355, where the finishing function designated by the user is executed, before being output to the sheet-discharge tray 352. Both the sheet-discharge trays 351 and 352 can move up and down, and an operation is also possible in which the sheet-discharge tray 351 is lowered, and sheets to which finishing processing has been applied by the processing unit 355 are stacked on the sheet-discharge tray 351. In a case in which saddle stitch bookbinding has been designated, sheets are folded in half after being stapled in the center by a saddle stitch processing unit 356, and are then output to a saddle stitch bookbinding tray 358 via a sheet conveyance path 357. The saddle stitch bookbinding tray 358 has the configuration of a belt conveyor, and is configured such that a saddle-stitched sheet bundle stacked on the saddle stitch bookbinding tray 358 is conveyed toward the left.

FIG. 4 depicts a view illustrating one example of an image-diagnosis setting screen 400 displayed to provide an instruction to execute image diagnosis in the first embodiment. This screen 400 is displayed on the display unit 241 of the inspection apparatus 109 in the first embodiment; however, the screen 400 may be displayed on the display unit 225 of the printing apparatus 107 or on the display unit 212 of the external controller 102. The image-diagnosis setting screen 400 includes diagnosis target settings 401, 402, and 403, a "reset settings" button 404, a "sheet setting" button 405, an "execute image diagnosis" button 406, and a "close" button 407.

The diagnosis target settings 401, 402, and 403 are areas for specifying types of image defects that are targets of image diagnosis. In the diagnosis target settings 401, the diagnosis target settings 402, and the diagnosis target settings 403, it can be set whether or not to perform image diagnosis with respect to displacement, blemishes (streaks), and blemishes (spots), respectively. In the example in FIG. 4, the checkbox in each of the diagnosis target settings is checked, and a setting is made so as to perform image diagnosis. Furthermore, if "diagnose" is selected in each of the diagnosis target settings 401, 402, and 403, diagnosis target colors can be set. As target colors, the colors used for image forming can be individually set, and, here, the toner colors Y, M, C, and K can be set. Each toner color is placed in a selected state when pressed once and placed in an unselected state when pressed again. In the example in FIG. 4, all the colors Y, M, C, and K are set as target colors. The "reset settings" button 404 is a button for setting the diagnosis target settings 401, 402, and 403 to the initial values thereof.

The "sheet setting" button 405 is a button for providing an instruction to set sheets to be used for image diagnosis and to display the setting made. When the "sheet setting" button 405 is pressed, sheets to be used for image diagnosis can be set as a result of a sheet setting screen being displayed, and the setting made is displayed in the settings.

FIG. 4 illustrates an example in which the setting of sheets is made in units of trays, and illustrates a state in which A4-size sheets in the feeding deck 301 are selected. When the "execute image diagnosis" button 406 is pressed, an instruction is provided to execute image diagnosis in accordance with the settings made using the sheet setting button 405 and the diagnosis target settings 401, 402, and 403. When the "close" button 407 is pressed, this image-diagnosis setting screen 400 is closed and an initial screen is displayed.

Figure 5:
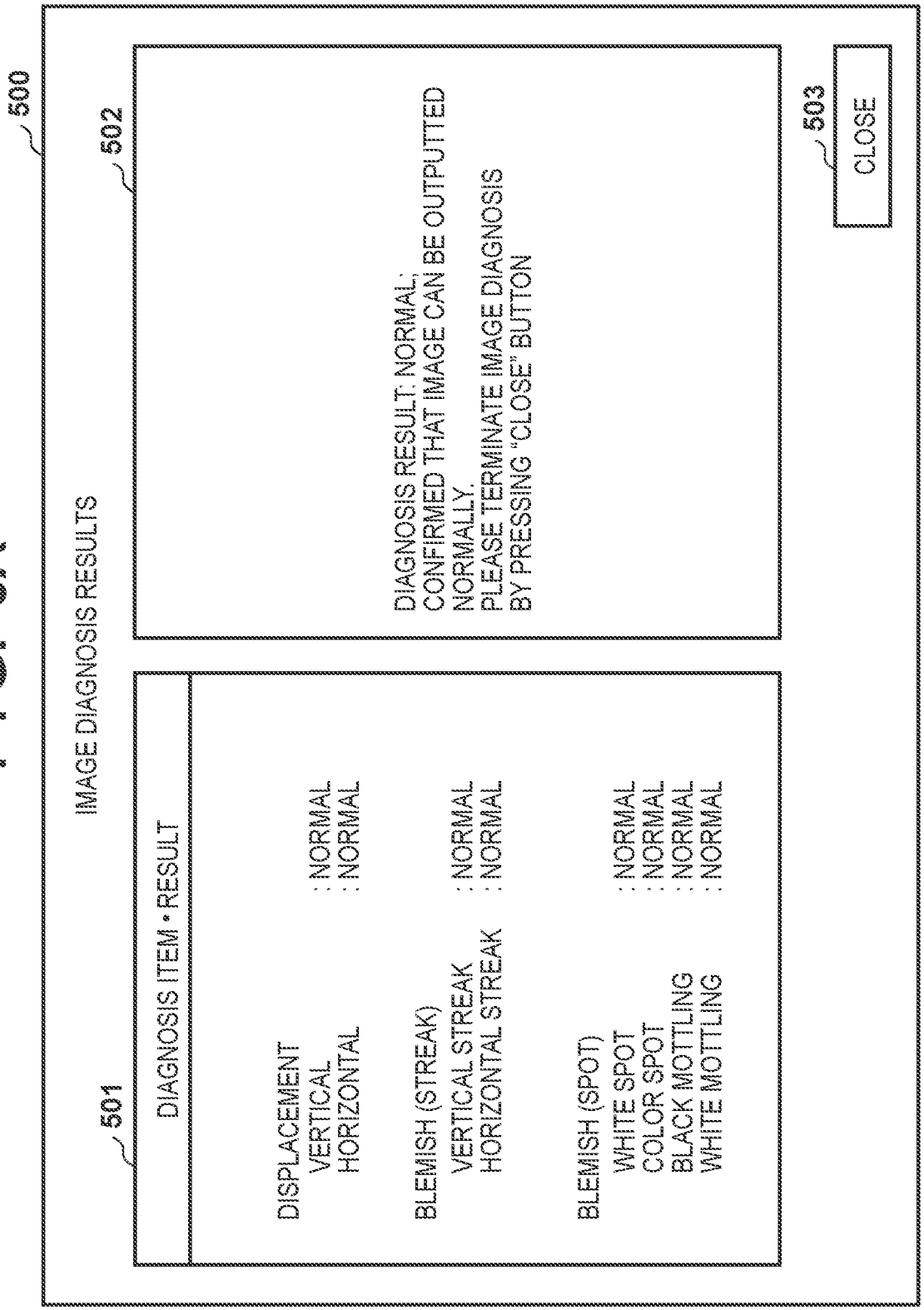
FIGS. 5A and 5B depict views respectively illustrating examples of an image-diagnosis result screen displaying image diagnosis results according to the first embodiment.

FIGS. 5A and 5B depict views respectively illustrating examples of an image-diagnosis result screen displaying image diagnosis results according to the first embodiment. The screens are displayed on the display unit 241 of the inspection apparatus 109 in the first embodiment; however, the screens may be displayed on the display unit 225 of the printing apparatus 107 or the display unit 212 of the external controller 102.

An image-diagnosis result screen 500 in FIG. 5A shows an example of the screen in a case in which the image diagnosis results are normal, or that is, in a case in which there are no image defects, and includes results 501 for individual diagnosis target items, an image-diagnosis result message 502, and a "close" button 503. In the results 501 for individual diagnosis target items, results are displayed for the individual types of image defects set as diagnosis targets in the diagnosis target settings 401, 402, and 403. Either "normal", "abnormal", or "automatic resolution" is displayed as a diagnosis result for each sub-item such as a type or direction of defect occurrence in the diagnosis targets as shown in FIGS. 5A and 5B. A dash (—) may be displayed for items that are not diagnosis targets. In the image-diagnosis result message 502, diagnosis results, and, should the diagnosis results include image defects, messages regarding countermeasures against the image defects are displayed. In FIGS. 5A and 5B, diagnosis results are displayed using specific words so that the diagnosis results can be understood by the user. When the "close" button 503 is pressed, this image-diagnosis result screen 500 is closed and an initial screen is displayed.

An image-diagnosis result screen 510 in FIG. 5B shows an example of the screen in a case in which the image diagnosis results are abnormal, or that is, in a case in which there are image defects.

In results 501 of FIG. 5B for individual diagnosis targets, "automatic resolution" is displayed for items whose image defects are determined as being resolvable by automatic resolution, and "abnormal" is displayed for items whose defects are determined as being unresolvable by automatic resolution. In addition to diagnosis results, the image-diagnosis result message 502 in FIG. 5B indicates that automatic resolution (registration adjustment here) has been performed, and presents necessary countermeasures for items that are unresolvable by automatic resolution. Furthermore, a "next" button 511 is displayed on the image-diagnosis result screen 510 in a case in which the image diagnosis results are "abnormal". A transition to a countermeasure screen is triggered when the "next" button 511 is pressed.

Figure 6:
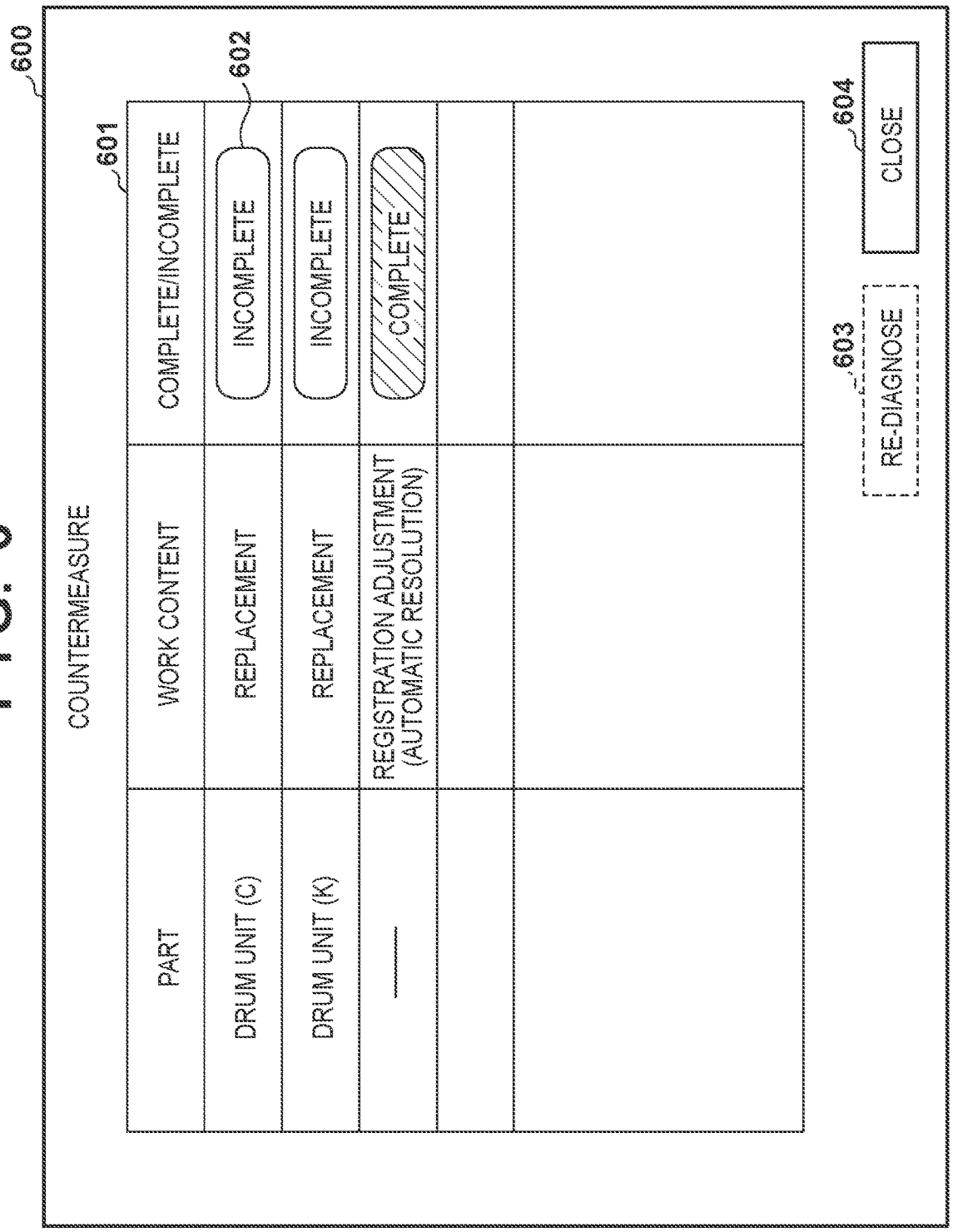
FIG. 6 depicts a view illustrating one example of a screen displaying a list of countermeasures that are necessary for resolving defects in items diagnosed as being defects in image diagnosis.

FIG. 6 depicts a view illustrating one example of a screen 600 displaying a list of countermeasures that are necessary to resolve defects in items diagnosed as being abnormal in image diagnosis.

This screen 600 is displayed when the "next" button 511 in FIG. 5B is pressed. This screen 600 is displayed on the display unit 241 of the inspection apparatus 109 in the first embodiment; however, the screen 600 may be displayed on the display unit 225 of the printing apparatus 107 or the display unit 212 of the external controller 102. This screen 600 is a screen in a case in which not all of the countermeasures determined as being necessary based on image diagnosis are complete, and includes a list of countermeasures 601, a "re-diagnosis" button 603 for providing an instruction to execute re-diagnosis, and a "close" button 604.

In the list of countermeasures 601, for each component that resulted in an image defect being diagnosed in image diagnosis, a countermeasure necessary to resolve the image defect, and an indication 602 indicating whether the countermeasure is complete or incomplete are displayed in the form of a list. A configuration may be adopted in which the determination of whether or not a countermeasure is complete is made based on an instruction from the user. Alternatively, a configuration may be adopted in which the CPU 222 of the printing apparatus 107 determines whether a countermeasure is complete or incomplete, and the result is received by the inspection apparatus 109 via the communication I/F 217 and the communication cable 255, and set by the CPU 238 of the inspection apparatus 109. In a case in which the state of completion/incompletion of a countermeasure indicated in an item in the list of countermeasures 601 changes, the display in an indication 602 indicating whether the corresponding countermeasure is complete or incomplete is switched.

Re-diagnosis processing is executed when the re-diagnosis button 603 is pressed. A configuration may be adopted in which the re-diagnosis button 603 does not operate even if pressed, unless "complete" is displayed in all of the indications 602, which indicate whether the countermeasures included in the list of countermeasures 601 are complete or incomplete. Alternatively, a configuration may be adopted in which the re-diagnosis button 603 operates if pressed, regardless of the states of the indications 602 indicating whether countermeasures are complete or incomplete. Furthermore, the re-diagnosis button 603 may be configured so as not to be displayed unless re-diagnosis can be executed, or may be configured so as to be grayed-out when re-diagnosis cannot be executed. Alternatively, the re-diagnosis button 603 may be configured so as to be displayed regardless of whether or not re-diagnosis can be executed. When the "close" button 604 is pressed, this screen 600 is closed and an initial screen is displayed.

In the example in FIG. 6, it is shown that, while automatic-resolution-based work is complete, the replacement of drum units (C) and (K) is incomplete.

Figure 7:
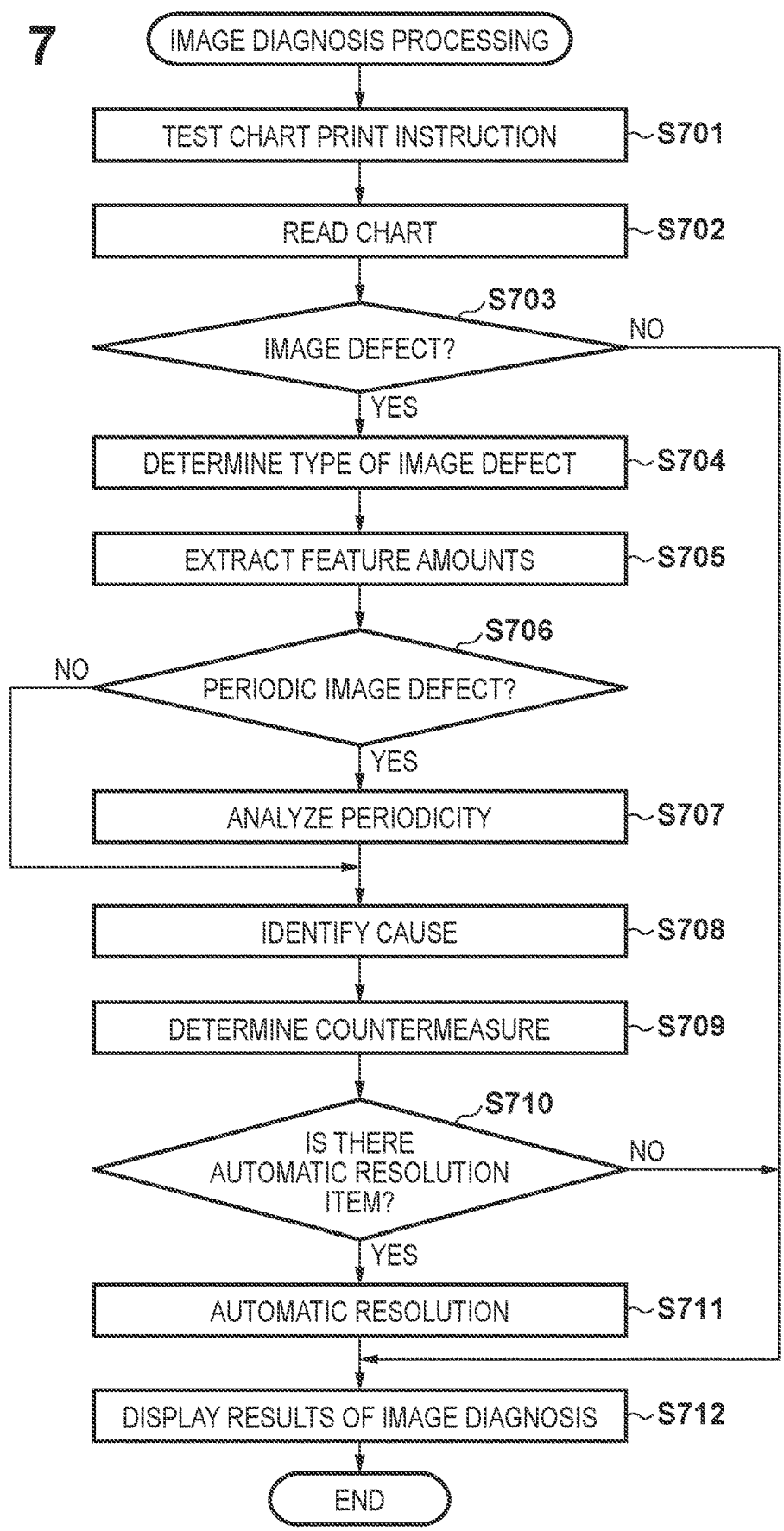
FIG. 7 is a flowchart for describing image diagnosis processing executed by an inspection apparatus according to the first embodiment.

FIG. 7 is a flowchart for describing image diagnosis processing executed by the inspection apparatus 109 according to the first embodiment. Note that the series of processing described in this flowchart is realized by the CPU 238 of the inspection apparatus 109 deploying the control program stored in the HDD 256 to the memory 239 and executing the deployed control program.

In step S701, the CPU 238 instructs the CPU 222 of the printing apparatus 107 to print a test chart. The image data to be printed as the test chart is determined based on the image diagnosis settings. As this image data, data stored in the HDD 221 of the printing apparatus 107 may be used, or data that is stored in the HDD 256 of the inspection apparatus 109 and that has been received together with a print instruction may be used. Then, upon receiving a response from the CPU 222 of the printing apparatus 107 that the printing of the test chart has been started, the processing advances to step S702. In step S702, in synchronization with the conveyance timing of the conveyed test chart, the CPU 238 instructs the imaging unit 240 to read the test chart. The number of test charts that are conveyed here changes depending on the image diagnosis settings; thus, reading processing is executed a number of times corresponding to the number of test charts that the printing apparatus 107 is instructed to print in step S701. After recording the image data read in such a manner to the HDD 256, the processing advances to step S703.

In step S703, the CPU 238 compares scanned image data obtained by reading the test chart in step S702 and the image data used for printing to determine whether or not an image defect is present in the scanned image data. In this process, the determination of whether or not an image defect is present may be similarly performed on scanned image data of all test charts read in step S702; alternatively, diagnosis targets may be set in advance for individual pieces of the scanned image data of the test charts, and the determination of whether or not an image defect is present may be performed on each piece of scanned image data. The processing advances to step S704 when the CPU 238 determines that an image defect is present, and the processing advances to step S712 when the CPU 238 determines that no image defect is present.

In step S704, from the scanned image data in which it is determined in step S703 that an image defect is present, the CPU 238 identifies which type of image defect has occurred. Here, in order to identify the type of image defect, a method of examining whether characteristics of different image defects are present in the scanned image data may be adopted. Alternatively, a method of comparing the scanned image data obtained in step S702 and image data of the test chart stored in the HDD 256 of the inspection apparatus 109 may be adopted. Furthermore, the identification of the type of image defect may be performed on individual pieces of read image data or may be executed on multiple pieces of read image data at once. The CPU 238 records, to the memory 239, the presence/absence of an image defect identified in such a manner separately for each type of image defect, and the processing advances to step S705.

In step S705, the CPU 238 extracts feature amounts that are determined with respect to each identified type of image defect. The feature amounts here, for example, are the positions of streaks, the widths of streaks, the number of streaks, the periodicity of streaks, and the like in the case of a vertical-streak-type image defect. Upon completing the extraction of the feature amounts, the CPU 238 stores the feature amounts in the memory 239 and the processing advances to step S706.

In step S706, the CPU 238 determines whether or not there is a periodicity in the image defect according to the type of image defect identified in step S704 and the feature amounts extracted in step S705. The processing advances to step S707 when the CPU 238 determines that the image defect is periodic, and otherwise the processing advances to step S708. In step S707, the CPU 238 analyzes the periodicity of the image defect according to the type of image defect identified in step S704 and the feature amounts extracted in step S705. For example, in the case of a vertical-streak-type image defect, the CPU 238 analyzes a periodicity in the occurrence of streaks from the positions and numbers of streaks. The CPU 238 stores the periodicity determined as a result of this analysis in the memory 239, and advances to step S708.

In step S708, the CPU 238 determines the cause of the image defect according to the type of image defect identified in step S704, the feature amounts extracted in step S705, and, if there is a periodicity in the image defect, the result of the analysis of the periodicity of the image defect. For example, the CPU 238 identifies the cause of the image defect by holding, in advance, a table consisting of image defect feature amounts and causes corresponding thereto, and applying the feature amounts extracted in step S705 to the table. After identifying the cause of the image defect in such a manner, the CPU 238 stores the cause in the memory 239 and the processing advances to step S709.

In step S709, the CPU 238 reads out the cause identified and stored in step S708, and determines a countermeasure corresponding to the cause. For example, the CPU 238 determines the countermeasure by holding, in advance, a table in which causes and countermeasures corresponding thereto are stored, and applying the cause identified in step S708 to the table. Examples of countermeasures include replacement and cleaning of parts. After determining a countermeasure in such a manner, the processing advances to step S710. In step S710, the CPU 238 determines whether or not the countermeasure determined in step S709 includes an item to be automatically resolved. The processing advances to step S711 if an item to be automatically resolved is included here, and otherwise the processing advances to step S712.

In step S711, the CPU 238 instructs the CPU 222 of the printing apparatus 107 to execute automatic resolution. Then, upon receiving, from the CPU 222 of the printing apparatus 107, a notification that the execution of automatic resolution is complete, the CPU 238 stores information to the effect that automatic resolution is complete in the memory 239, and the processing advances to step S712. In step S712, the CPU 238 displays the image diagnosis execution results on the display unit 241 of the inspection apparatus 109. The screen illustrated in FIG. 5A or FIG. 5B described above indicates an example of the screen displayed here. Here, diagnosis items without image defects are displayed as "normal", and items with image defects are displayed as "abnormal". Furthermore, information to the effect that automatic resolution is complete is displayed for items for which automatic resolution has been executed. After displaying an image-diagnosis result screen on the display unit 241 in such a manner, the CPU 238 terminates this processing.

According to this processing, upon determining, as a result of image diagnosis, that there is a defect in a printed matter printed by the printing apparatus 107, the inspection apparatus can identify the cause of the defect and present to the user a countermeasure for resolving the defect. Furthermore, in this image diagnosis, diagnosis targets (for example, displacement (registration), blemishes, etc., and target colors) can be set, and it is determined whether each diagnosis target is in a normal state.

Figure 8:
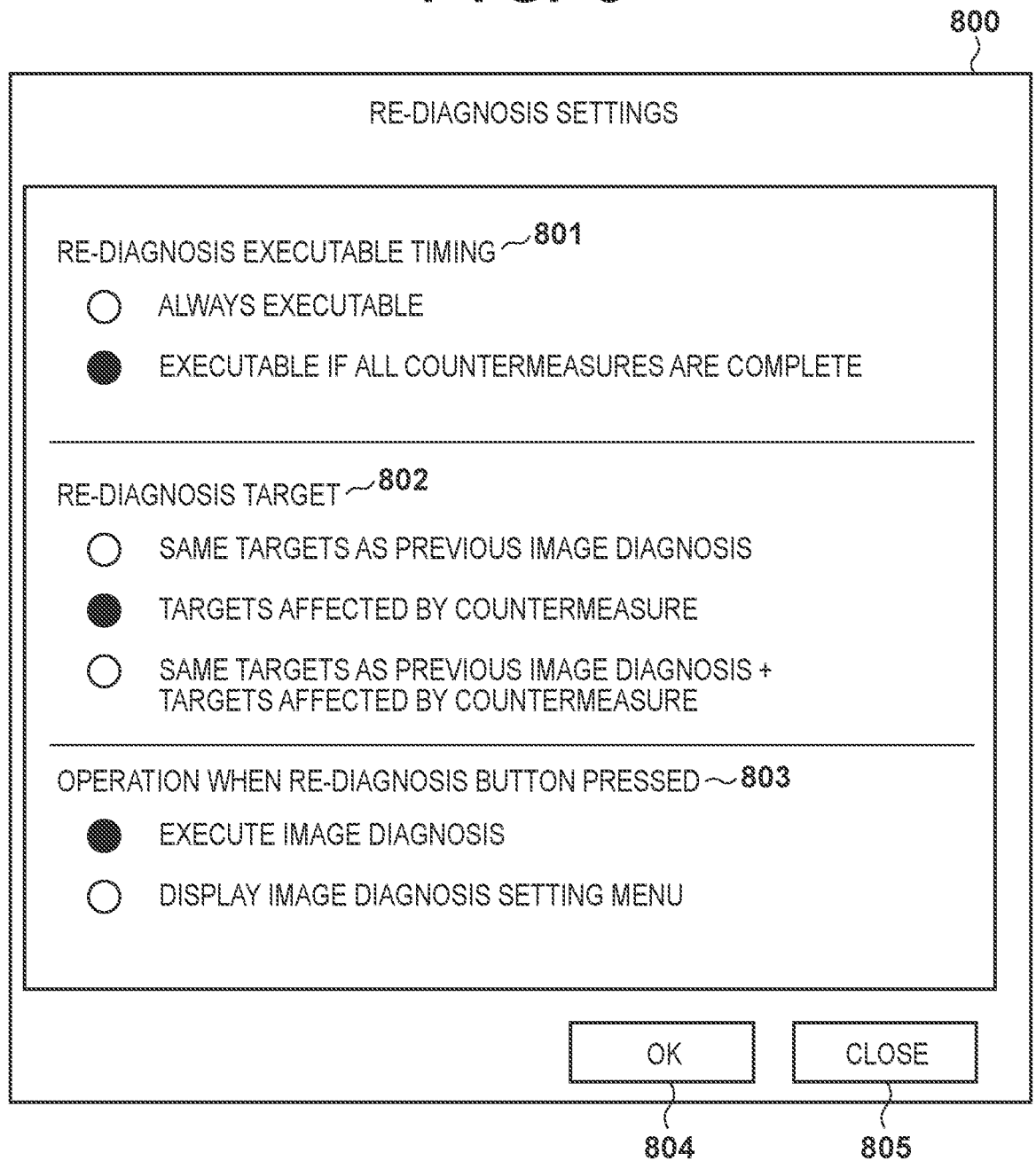
FIG. 8 depicts a view illustrating one example of a re-diagnosis setting screen in the first embodiment.

FIG. 8 depicts a view illustrating one example of a re-diagnosis setting screen 800 in the first embodiment.

This screen 800 is displayed on the display unit 241 of the inspection apparatus 109 in the first embodiment; however, the screen 800 may be displayed on the display unit 225 of the printing apparatus 107 or the display unit 212 of the external controller 102. Settings selected on the re-diagnosis setting screen are stored in the HDD 256 of the inspection apparatus 109.

The re-diagnosis setting screen 800 includes a "re-diagnosis executable timing" setting 801, a "re-diagnosis target" setting 802, an "operation when re-diagnosis button is pressed" setting 803, an "OK" button 804, and a "close" button 805.

The "re-diagnosis executable timing" setting 801 is an item for setting the timing when execution of re-diagnosis is enabled. In a case in which "always executable" is set as the re-diagnosis executable timing, the re-diagnosis button 603 in FIG. 6 is displayed regardless of whether or not countermeasures are complete. In a case in which "executable if all countermeasures are complete" is set as the re-diagnosis executable timing, the re-diagnosis button 603 is displayed if all countermeasures determined as being necessary based on image diagnosis are complete. In the example in FIG. 8, "executable if all countermeasures are complete" is selected.

The "re-diagnosis target" setting 802 is an item for setting re-diagnosis targets. In a case in which "same targets as previous image diagnosis" is set as the re-diagnosis targets, re-diagnosis is performed on the same targets as the targets of the previous image diagnosis. In a case in which "targets affected by countermeasures" is set as the re-diagnosis targets, re-diagnosis is performed only on targets affected by countermeasures determined as being necessary based on the previous image diagnosis. In a case in which "same targets as previous image diagnosis+targets affected by countermeasures" is set as the re-diagnosis targets, diagnosis is performed on targets affected by countermeasures determined as being necessary based on the previous image diagnosis, in addition to the targets of the previous image diagnosis. In the example in FIG. 8, "targets affected by countermeasures" is selected.

The "operation when re-diagnosis button is pressed" setting 803 is an item for setting the operation to be executed in a case in which an instruction to execute re-diagnosis is provided as a result of the re-diagnosis button 603 in FIG. 6 being pressed in a state in which re-diagnosis is executable. In a case in which "execute image diagnosis" is set, image diagnosis is executed on the targets set in the "re-diagnosis target" setting 802. In a case in which "display image-diagnosis setting menu" is set, the image-diagnosis setting screen 400 in FIG. 4 is displayed. Note that, when the image-diagnosis setting screen 400 is displayed as a result of the re-diagnosis button 603 being pressed in the screen in FIG. 6, the image-diagnosis setting screen 400 may be in a state in which targets set in the "re-diagnosis target" setting 802 are selected in advance. In the example in FIG. 8, "execute image diagnosis" is selected.

Figure 9:
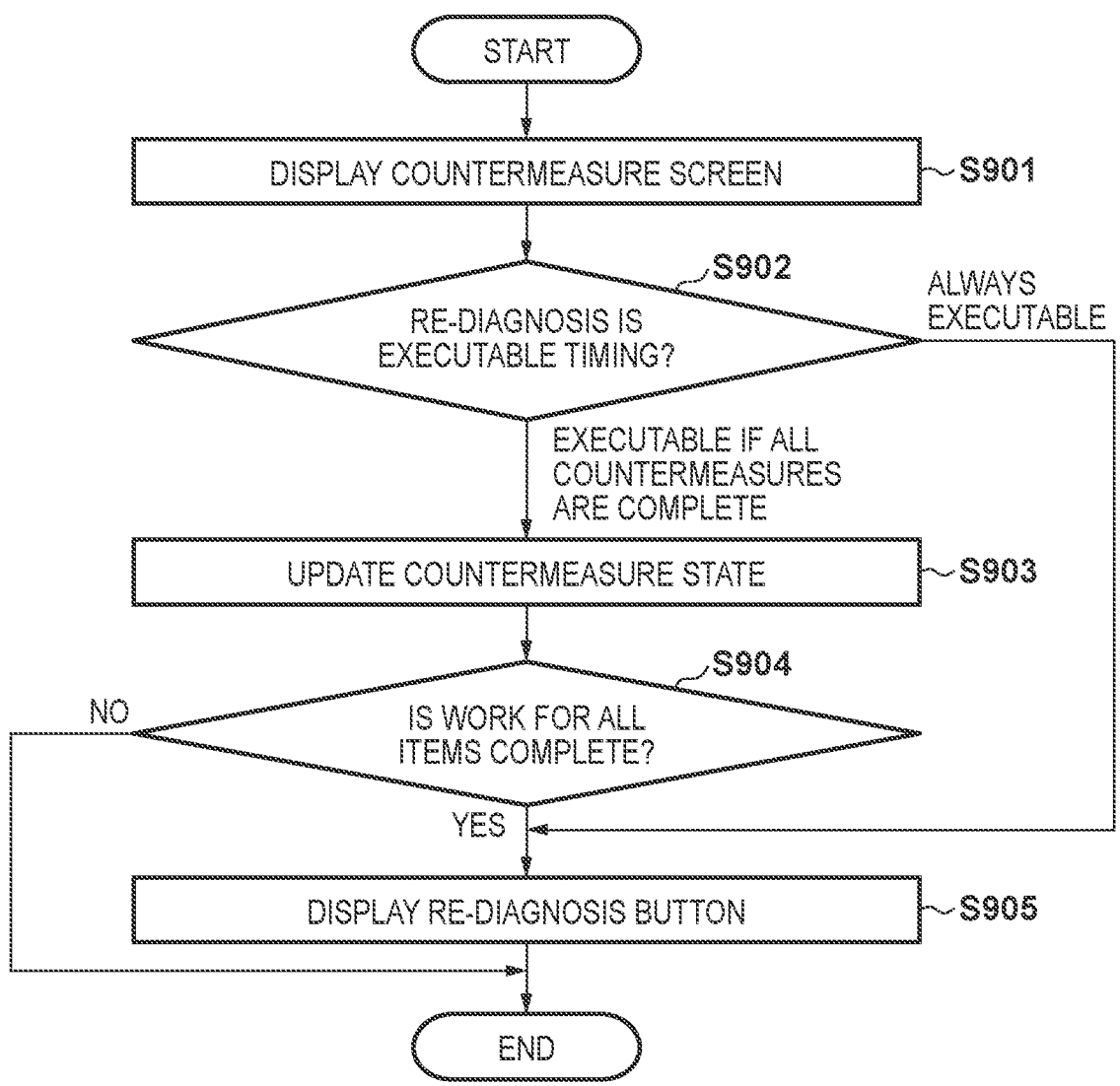
FIG. 9 is a flowchart for describing processing when the inspection apparatus according to the first embodiment displays a re-diagnosis button on the countermeasure screen.

FIG. 9 is a flowchart for describing processing when the inspection apparatus 109 according to the first embodiment displays the re-diagnosis button 603 on the countermeasure screen, and this processing is started when the "next" button 511 in FIG. 5B is pressed. Note that the series of processing described in this flowchart is realized by the CPU 238 of the inspection apparatus 109 deploying the control program stored in the HDD 256 to the memory 239 and executing the control program.

In step S901, the CPU 238 displays the countermeasure screen illustrated in FIG. 6, for example, on the display unit 241. In this screen, for each component that resulted in an abnormality being diagnosed in image diagnosis, work necessary to resolve the abnormality, and whether or not the countermeasure is complete are displayed in the form of a list. After displaying this countermeasure screen, the processing advances to step S902. In step S902, the CPU 238 checks the re-diagnosis executable timing (condition). The CPU 238 checks the setting in the "re-diagnosis executable timing" setting 801 in FIG. 8, and the processing advances to step S905 if the CPU 238 determines that "always executable" is set and the processing advances to step S903 if the CPU 238 determines that "executable if all countermeasures are complete" is set. Note that, in a case in which "always executable" is set here, the CPU 238 checks and updates countermeasure states after this processing is terminated.

In step S903, the CPU 238 determines whether or not countermeasures for resolving image defects are complete, and, if there has been changes from when checking was performed last time, switches the indications 602 indicating whether countermeasures are complete or incomplete for the corresponding items and displays the switched indications 602 on the display unit 241. After checking and switching all of such items, the processing advances to step S904. In step S904, the CPU 238 determines whether or not all countermeasures for resolving image defects are complete. The processing advances to step S905 when the CPU 238 determines that all countermeasures are complete here, and the CPU 238 terminates this processing upon determining that not all countermeasures are complete. In step S905, the CPU 238 adds display of the re-diagnosis button 603 on the display unit 241. The re-diagnosis button 603 in FIG. 6 is an example of the display added here. After adding display of the re-diagnosis button 603 in such a manner, the CPU 238 terminates this processing.

As description has been provided up to this point, in accordance with a re-diagnosis executable timing set in re-diagnosis settings, the inspection apparatus can display a button for providing an instruction to execute re-diagnosis on a countermeasure screen according to this processing.

Figure 10:
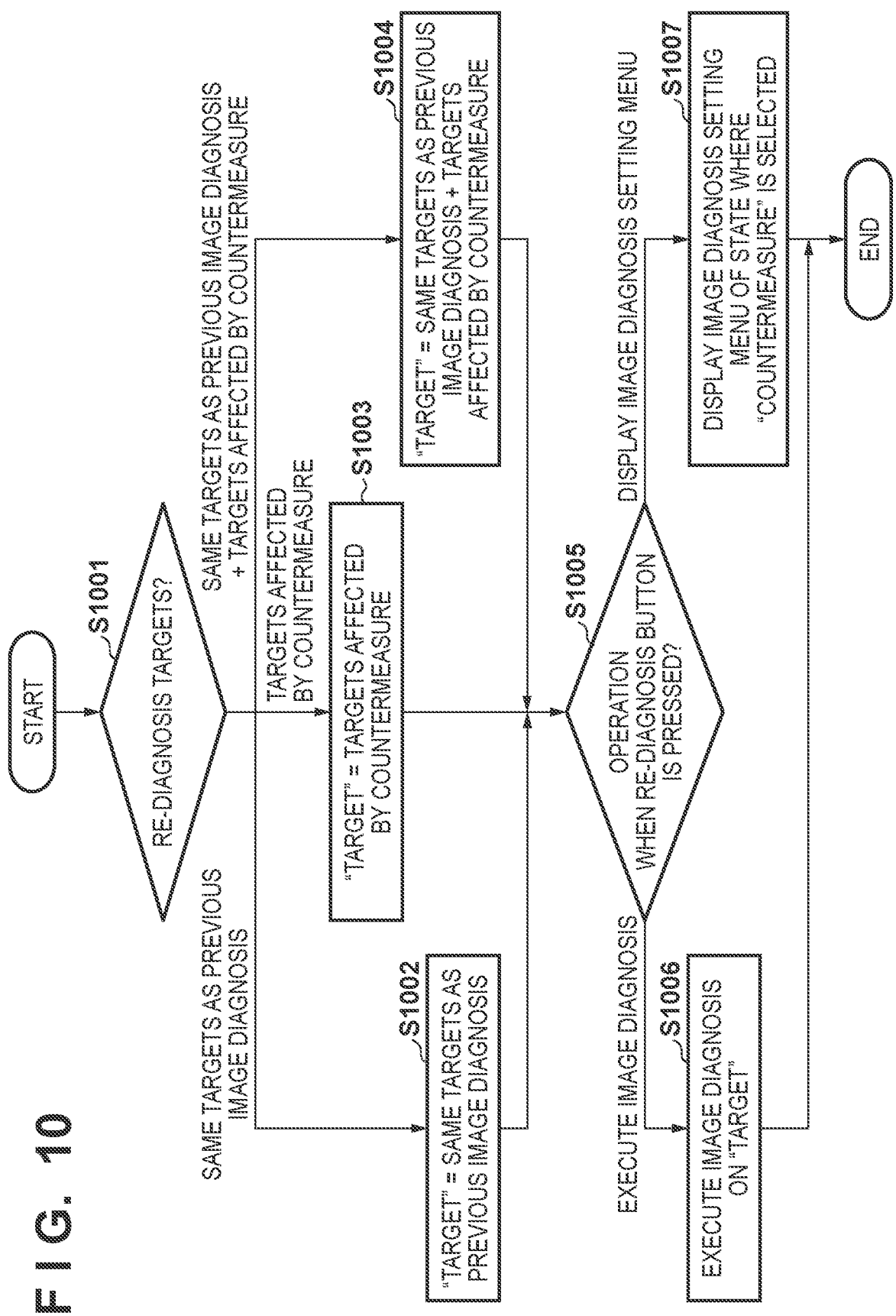
FIG. 10 is a flowchart for describing processing that the inspection apparatus according to the first embodiment executes as a result of the re-diagnosis button being pressed.

FIG. 10 is a flowchart for describing processing that the inspection apparatus 109 according to the first embodiment executes as a result of the re-diagnosis button 603 being pressed. Note that the series of processing described in this flowchart is realized by the CPU 238 of the inspection apparatus 109 deploying the control program stored in the HDD 256 to the memory 239 and executing the control program.

In step S1001, the CPU 238 confirms the re-diagnosis targets. These are the targets selected in the "re-diagnosis target" setting 802 in the re-diagnosis setting screen in FIG. 8 described above. Here, the processing advances to step S1002 if the CPU 238 determines that the targets are the "same targets as previous image diagnosis", the processing advances to step S1003 if the CPU 238 determines that the targets are the "targets affected by countermeasures", and the processing advances to step S1004 if the CPU 238 determines that the targets are the "same targets as previous image diagnosis+targets affected by countermeasures". In each of steps S1002, S1003, and S1004, the CPU 238 stores the re-diagnosis targets confirmed in step S1001 in the memory 239. Then, the processing advances to step S1005.

In step S1005, the CPU 238 checks the operation to be executed when the re-diagnosis button 603 is pressed. This operation is the operation set in the "operation when re-diagnosis button is pressed" setting 803 in FIG. 8 described above. The processing advances to step S1006 if the CPU 238 determines that the operation is "execute image diagnosis", and the processing advances to step S1007 if the CPU 238 determines that the operation is "display image-diagnosis setting menu". In step S1006, the CPU 238 executes image diagnosis on the re-diagnosis targets stored in step S1002, S1003, or S1004. After executing image diagnosis in such a manner, the CPU 238 terminates this processing. In step S1007, the CPU 238 displays the image-diagnosis setting screen 400 illustrated in FIG. 4 on the display unit 241, for example. Here, the CPU 238 displays the screen in a state in which the re-diagnosis targets stored in step S1002, S1003, or S1004 are selected as diagnosis targets. After displaying the image-diagnosis menu in step S1007 in such a manner, the CPU 238 terminates this processing.

As described up to this point, according to the first embodiment, an input of a diagnosis target is accepted from a user, and image diagnosis is executed with respect to the input target. Then, if the result of the diagnosis is that there is an abnormality, a countermeasure determined as being necessary is presented to the user. Then, after the countermeasure is complete, a display for providing an instruction to execute re-diagnosis, if necessary, is added. If an instruction to execute re-diagnosis is provided, image diagnosis is executed on a portion designated as the target of the re-diagnosis, and the presence/absence of image defects can be determined, and, should an image defect be found, the type and cause of the image defect can be identified. Thus, the number of operations that are necessary for re-diagnosis can be reduced compared to the number of operations that are conventionally necessary, and the check of whether or not an image defect has been resolved can be performed efficiently.

Note that, while the control program for product inspection and image diagnosis is executed on the CPU 238 of the inspection apparatus 109 in the first embodiment, the inspection apparatus 109 may transmit read images to the printing apparatus 107, the external controller 102, or the PC 103, and the control program may be executed on the transmission-destination apparatus.

Second Embodiment

Next, a second embodiment of the present invention will be described. In the second embodiment, description will be provided based on an example in which the user is prompted to execute image diagnosis processing before executing a job if the user has performed maintenance work such as the replacement of a part of the image forming apparatus 101. Note that the maintenance work by the user also includes daily maintenance work other than maintenance work that becomes necessary in a case such as when product-inspection results are "no good" (NG). Note that, because the configuration of the image processing system, the hardware configurations of the individual apparatuses, etc., according to the second embodiment are the same as those in the above-described first embodiment, description thereof will be omitted.

Figure 11A:
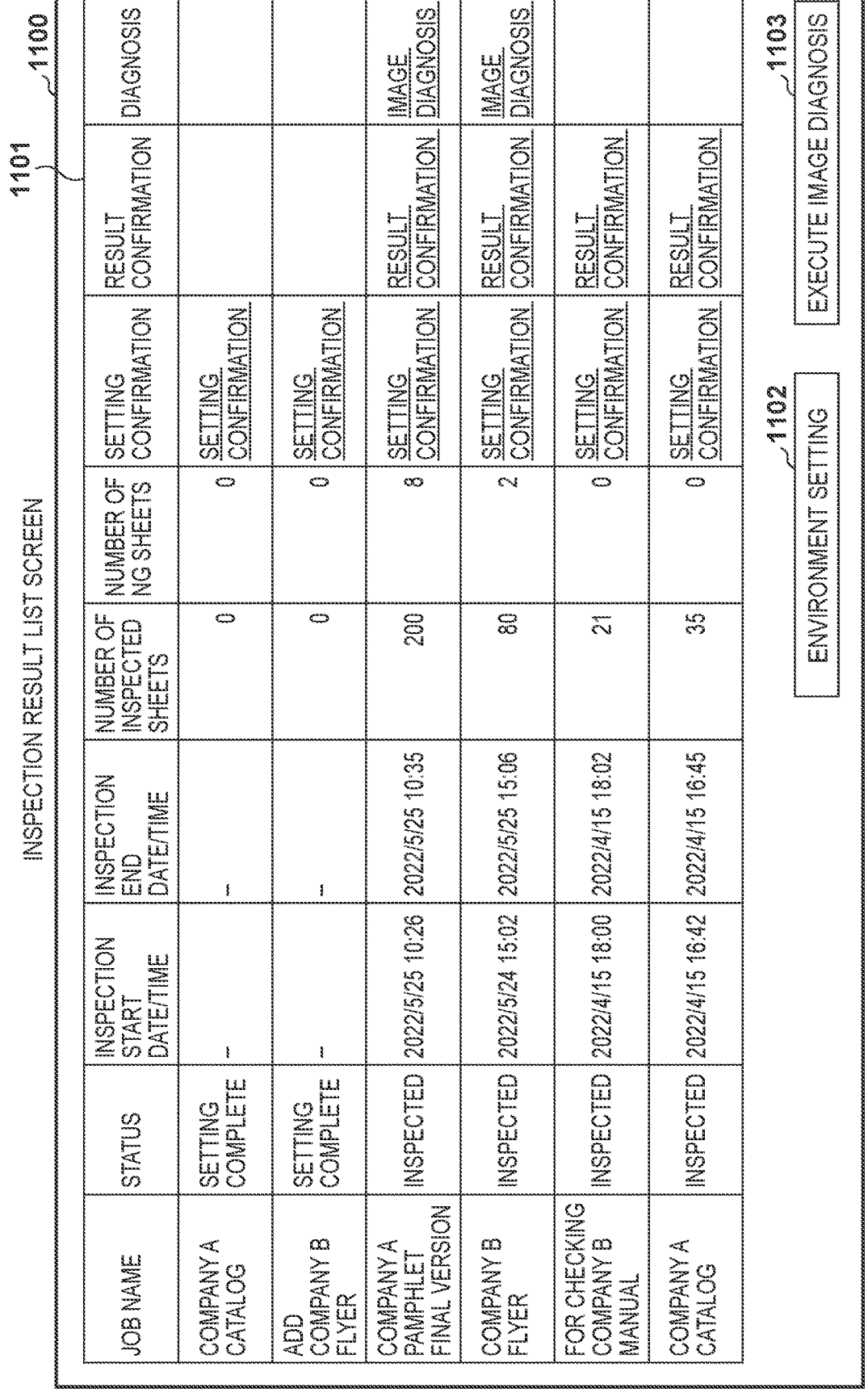

FIGS. 11A and 11B depict views respectively illustrating examples of inspection-result checking screens displaying results of product-inspection processing according to the second embodiment of the present invention. Description will be provided here assuming that these screens are displayed on the display unit 241 of the inspection apparatus 109; however, the screens may be displayed on the display unit 225 of the printing apparatus 107 or the display unit 212 of the external controller 102.

FIG. 11A depicts a view illustrating an example of a screen displaying a list of product-inspection results.

An inspection-result list screen 1100 includes an inspection-result list 1101, an "environment setting" button 1102, and an "execute image diagnosis" button 1103. The inspection-result list 1101 displays, in the form of a list, results of product-inspection jobs that have been registered as product-inspection jobs. Here, for each product-inspection job, a job name for identifying the job, a status indicating the execution status of the product-inspection job, an inspection start date/time, an inspection end date/time, the number of inspected sheets, and the number of NG sheets are displayed as results. Furthermore, a "check settings" link for transitioning to a screen for checking the settings of a selected product-inspection job, a "check results" link for transitioning to an inspection-result checking screen 1110 in FIG. 11B, and an "image diagnosis" link for transitioning to a screen for executing image diagnosis based on product-inspection results are also displayed.

In the result list 1101, inspected jobs whose inspection is already finished, and jobs whose settings have been made but whose product inspection is yet to be performed are displayed. For inspected jobs, "inspection complete" is displayed as a status, an inspection start date/time, an inspection end date/time, the number of inspected sheets, and the number of NG sheets are displayed, and a link for transitioning to the inspection-result checking screen 1110 is displayed. Furthermore, the "image diagnosis" link is shown if NGs have occurred as a result of product inspection and it is determined that image diagnosis should be executed. For uninspected jobs, "setting complete" is displayed as a status, and, for each item other than the "check settings" link, a value indicating that the value for the item is yet to be determined is displayed. The "environment setting" button 1102 is a button for displaying an environment setting screen of this image processing system, and a transition to the environment setting screen (unillustrated) is triggered if this button 1102 is selected. The "execute image diagnosis" button 1103 is a button for displaying an image diagnosis execution screen, and a transition to the image-diagnosis setting screen 400 in FIG. 4 in the first embodiment described above is triggered when this button 1103 is selected.

FIG. 11B is a diagram illustrating one example of the checking screen 1110 for confirming inspection results.

This checking screen 1110 is a screen for displaying details of inspection results relating to the selected job when the "check results" link for an inspected job in the inspection-result list 1101 in FIG. 11A is selected. Here, a case in which a total of 80 sheets (16 copies of a print job in which 5 sheets are printed per copy) were printed and 2 NG sheets occurred in product inspection is illustrated as an example. The checking screen 1110 includes thumbnails 1111 of a sheet that was NG in product inspection, an inspection result summary 1112, a product-inspection NG list 1113, an "execute image diagnosis" button 1114, and a "close" button 1115. In the product-inspection NG thumbnails 1111, scanned images of the front and back sides of a sheet whose inspection result was NG are displayed. In a case in which NGs have occurred in multiple sheets, switching to images of another sheet that was NG in product inspection can be performed by selecting the selection buttons below the thumbnails. Specifically, in FIG. 11B, two sheets were NG in product inspection, and thumbnails of the first and second sides of the first sheet in which an NG occurred are displayed. Here, by selecting the right-side selection button below the thumbnails, thumbnails of the first and second sides of the second sheet in which an NG occurred can be displayed. The inspection result summary 1112 is an area in which results obtained by summarizing the inspection results of a product-inspection job are displayed. Here, the inspection result summary 1112 includes the number of inspected sheets (80 sheets in this example), the number of sheets whose inspection results were NG (2 sheets in this example), an NG ratio (2.5% in this example), and the total number of printing and reading errors (0 sheets in this example). Furthermore, the total number of occurrences of each of displacement (vertical), displacement (horizontal), blemishes (spots), and blemishes (streaks)), which are causes of failures in inspection, are displayed. Here, it can be seen that blemishes (streaks) occurred in two sheets.

In the NG list 1113, the following information is displayed for each sheet that was NG: the ordinal position of the sheet in the entire product-inspection job; the ordinal position of the sheet within a job; a copy number; front or back side (1 indicates the front and 2 indicates the back); and OK or NG for each cause of NG. In the drawing, NGs (blemishes (streaks)) are detected on the front sides of the 72nd (2nd sheet in the 15th copy) and 78th (3rd sheet in the 16th copy) sheets. Furthermore, an inspection date/time, and a "check" link to scanned images of the sheet in which an NG occurred are displayed. If the NG image "check" link is selected, scanned images of the sheet that was NG in product inspection are displayed. The "execute image diagnosis" button 1114 is a button for providing an instruction to execute image diagnosis, and a transition to the image-diagnosis setting screen 400 in FIG. 4 is triggered if the instruction is provided. The "close" button 1115 is a button for providing an instruction to close this inspection-result checking screen. When the instruction is provided via the "close" button 1115, a transition to the inspection-result list screen 1100, which was displayed prior to the transition to this screen, is triggered.

FIG. 12 depicts a view illustrating one example of a part list 1201 indicating a list of parts that are targets of image diagnosis according to the second embodiment and image-diagnosis items for the parts. This list 1201 is stored in the HDD 221 of the printing apparatus 107, and is referred to in order to specify image-diagnosis items that are to be performed when parts have been replaced by the user.

This list 1201 indicates a list of image diagnosis target parts and diagnosis items corresponding thereto, and an assumption is made that the quality of output products (printed matters) will be affected if maintenance of the parts is performed by the user. Image-diagnosis items 1202 indicate image-diagnosis items the execution of which is recommended to the user when maintenance of each part is performed. For example, maintenance of the fixing apparatus performed by the user would affect streak-like blemishes and spot-like blemishes; thus, it is recommended that the user checks whether or not such image defects have occurred before executing an important job. The screen for setting image diagnosis settings to be applied upon execution of image diagnosis, the display of image diagnosis results, etc., are the same as those in the case described with reference to FIGS. 4 and 5 pertaining to the first embodiment described above, and description thereof will thus be omitted.

FIG. 13 depicts a view illustrating one example of an image-diagnosis recommendation screen displayed by the inspection apparatus 109 according to the second embodiment. The CPU 238 of the inspection apparatus 109 displays this screen on the display unit 241 when the user has performed maintenance of a part.

Upon detecting that the user has performed maintenance of specific parts of the printing apparatus 107, the CPU 238 of the inspection apparatus 109 displays, on the display unit 241, a pop-up 1301 for recommending the user to perform image diagnosis. The example in FIG. 13 illustrates a case in which the user has performed maintenance of the fixing apparatus. A message 1302 indicates a message to the effect that the user is recommended to perform image diagnosis when the user has performed maintenance of specific parts, and the words in the message are fixed regardless of the type of part whose maintenance has been performed.

A maintenance-target part 1303 indicates the part whose maintenance has been performed by the user, and "fixing unit" is displayed as the name of the part in the example in FIG. 13. Recommended diagnosis items 1304 indicate recommended diagnosis items associated with the part whose maintenance has been performed by the user. The CPU 238 determines the image-diagnosis items to be displayed in the recommended diagnosis items 1304 based on the part whose maintenance has been performed by the user and the contents of the image-diagnosis-target-part list 1201 in FIG. 12. In the example in FIG. 13, the user is prompted to execute diagnosis of blemishes (streaks) and blemishes (spots), which are image-diagnosis items associated with the fixing unit.

An "execute immediately" button 1305 is a button for providing an instruction to execute image diagnosis immediately. When the user presses the "execute immediately" button 1305, the CPU 238 executes image diagnosis of the diagnosis items recommended in the diagnosis items 1304. On the other hand, a "close" button 1306 is a button for closing the pop-up 1301. If the user chooses not to execute image diagnosis immediately due to some reason in a case in which the pop-up 1301 has been displayed, the user can close the pop-up 1301 by pressing the "close" button 1306.

As described above, in the second embodiment, in a case in which a part whose maintenance the user has performed corresponds to a part associated with an image-diagnosis item, the image-diagnosis item associated with the part is specified, and a pop-up recommending that the user execute image diagnosis processing of the diagnosis item is displayed.

Figure 14:
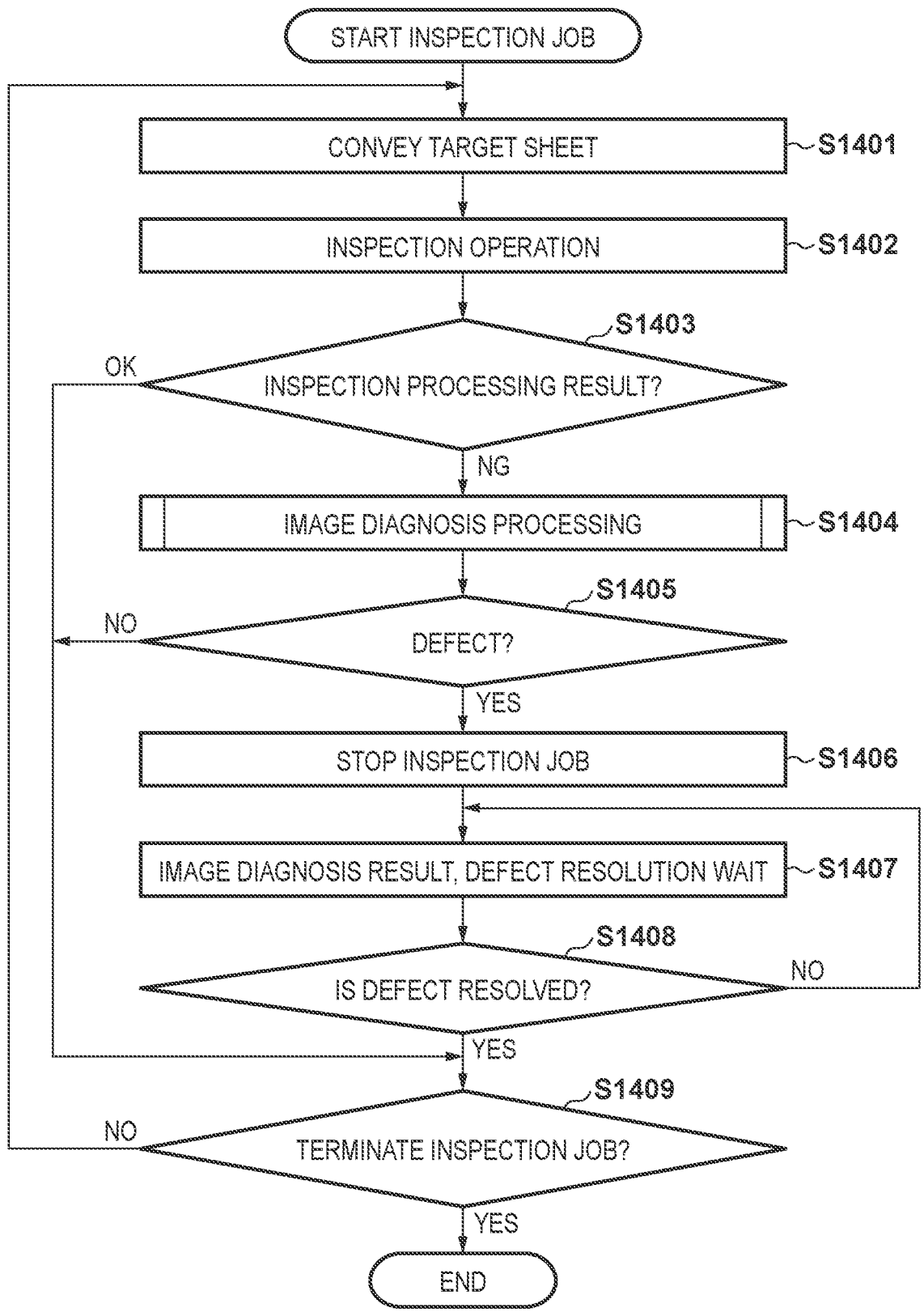
FIG. 14 is a flowchart for describing processing when the inspection apparatus according to the second embodiment executes product-inspection processing and subsequently executes image diagnosis.

FIG. 14 is a flowchart for describing processing when the inspection apparatus 109 according to the second embodiment executes product-inspection processing and subsequently executes image diagnosis. The processing illustrated in this flowchart is realized by the CPU 238 of the inspection apparatus 109 deploying the control program from the HDD 256 to the memory 239 and executing the control program.

When an instruction to start executing a product-inspection job is received from the user, an instruction to start printing is provided from the external controller 102 to the printing apparatus 107. Thus, a recording sheet (printed matter) on which an image has been printed by the printing apparatus 107 is conveyed from the printing apparatus 107 to the inspection apparatus 109 via the inserter 108. In step S1401, the CPU 238 conveys the sheet having the inspection-target image formed thereon to a conveyance path. Next, in step S1402, the CPU 238 reads the image on the sheet using an image reading sensor (imaging unit 240) in synchronization with the conveyance timing of the sheet, and executes a product-inspection operation by comparing a reference image and a scanned image obtained by this reading. In this product inspection operation, the CPU 238 stores the scanned image in the HDD 256, determines, as product-inspection results, whether or not image defects have occurred and the causes thereof if defects have occurred, and stores such information as product-inspection results. Once product-inspection results are determined in such a manner, the CPU 238 stores the details of the results in the memory 239 and the processing advances to step S1403. In step S1403, the CPU 238 determines whether the product-inspection results of the product-inspection processing are OK or NG. The processing advances to step S1409 if the CPU 238 determines that the product-inspection results are OK, and the processing advances to step S1404 if the CPU 238 determines that the product-inspection results are NG. In step S1404, the CPU 238 executes image diagnosis processing. The details of this image diagnosis processing are the same as those in the flowchart in FIG. 7 pertaining to the first embodiment, and description thereof will be omitted. Thus, once image diagnosis finishes and the CPU 238 obtains a diagnosis result, the processing advances to step S1405.

In step S1405, the CPU 238 determines whether or not the result of the image diagnosis executed in step S1404 was that a defect was present. The processing advances to step S1406 if the CPU 238 determines that the image diagnosis result was that a defect was present, and the processing advances to step S1409 if the CPU 238 determines that no defect has occurred. In step S1409, the CPU 238 determines whether or not the product-inspection job is still continuing based on whether or not there is a product-inspection target sheet, and advances to step S1401 if there is a product-inspection target sheet and terminates the present flow if there is no product-inspection target sheet.

In step S1406, the CPU 238 notifies the CPU 222 of the printing apparatus 107 that the product-inspection job is to be stopped, and the processing advances to step S1407. In step S1407, the CPU 238 waits for the user to perform an operation for resolving the defect in the image diagnosis result. Here, the CPU 238 determines that an operation was received from the user upon receiving a notification from the CPU 222 of the printing apparatus 107 that an operation from the user has occurred, or if a user operation is performed on the operation unit 242 of the inspection apparatus 109, and the processing advances to step S1408. The user operation here may be the execution of part replacement, part cleaning, operation/modification of part information, etc., of a part of the printing apparatus 107 for resolving the cause of the abnormality of the image diagnosis result.

In step S1408, as a result of image diagnosis, the CPU 238 determines whether or not the image defect has been resolved by the user operation accepted in step S1407. Here, for example, in a case in which the process for resolving the image defect was replacement of a part, the CPU 238 can perform the determination as a result of the printing apparatus 107 detecting that the part has been replaced and notifying the CPU 238 that the part has been replaced. Alternatively, the CPU 238 can determine that the defect has been resolved in a case in which the user notifies the CPU 238 that the part has been replaced. The processing advances to step S1409 if the CPU 238 determines in step S1408 that the image defect has been resolved as a result of image diagnosis in such a manner, and the processing advances to step S1407 and waits for the image defect to be resolved if the CPU 238 determines that the image defect has not been resolved in step S1408.

According to this processing, upon detecting a defect in an image in product-inspection processing, the inspection apparatus 109 executes image diagnosis processing corresponding to the type of the defect. Furthermore, when it is determined that no image defect is present as a result of the image diagnosis processing, the inspection apparatus 109 continues the product-inspection processing, whereas, in a case in which an image defect was present as a result of the image diagnosis processing, the inspection apparatus 109 stops the product-inspection processing and recommends the user to perform part maintenance for resolving the defect.

Figure 15:
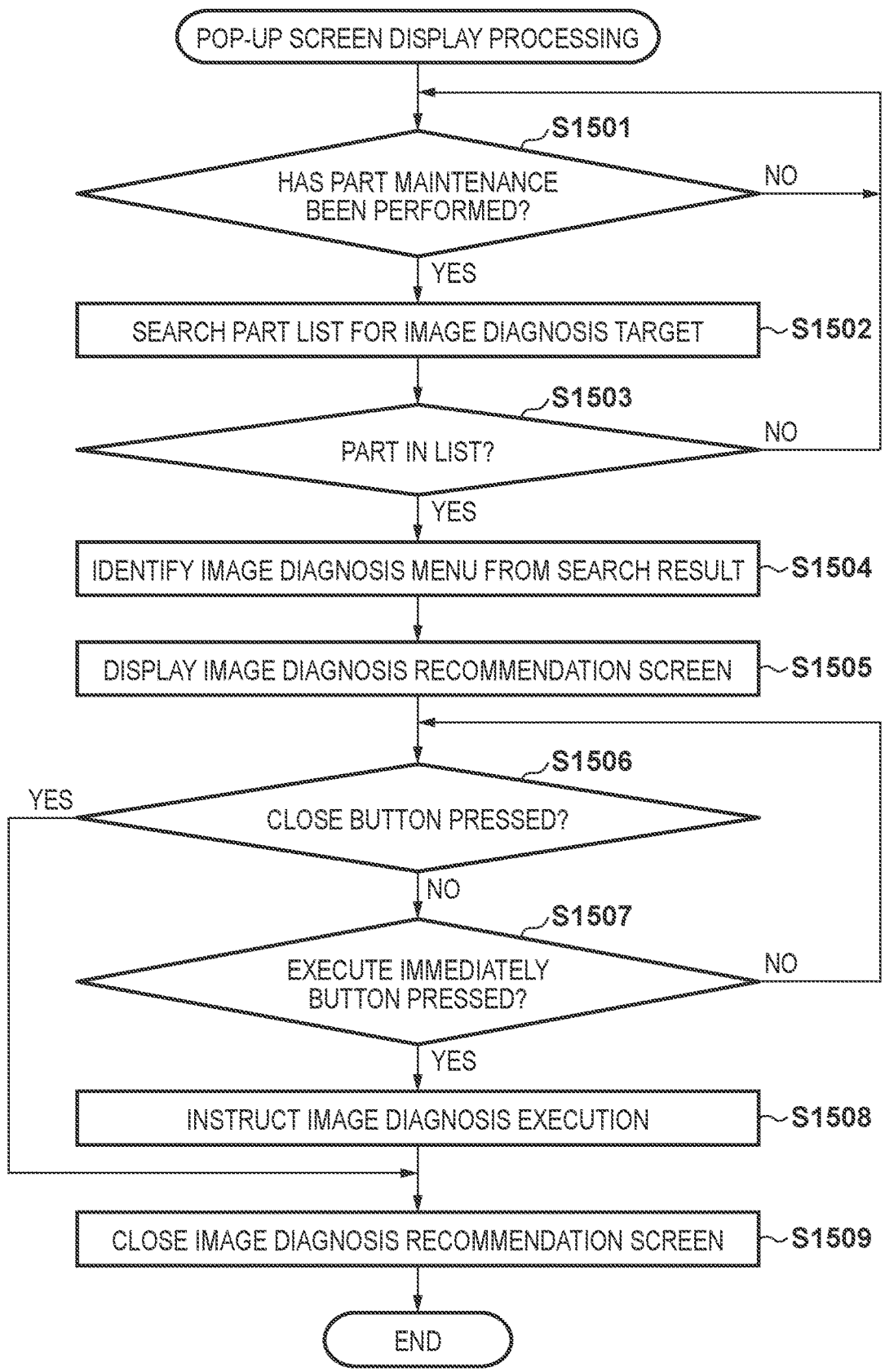
FIG. 15 is a flowchart for describing processing when the inspection apparatus according to the second embodiment displays a pop-up recommending execution of image diagnosis when a user has performed maintenance of a part.

FIG. 15 is a flowchart for describing processing when the inspection apparatus 109 according to the second embodiment displays a pop-up recommending execution of image diagnosis when a user has performed maintenance of a part. Note that the processing described in this flowchart is realized by the CPU 238 of the inspection apparatus 109 deploying the control program from the HDD 256 to the memory 239 and executing the control program.

In step S1501, the CPU 238 determines whether or not maintenance of a part has been performed by the user. The method for detecting whether or not maintenance of a part has been performed may be a method in which, when each part is replaced, the attachment/detachment or the like of the part is automatically detected by means of a sensor in the portion of the printing apparatus 107 to which the part is attached. Alternatively, a method may be adopted in which the user performs, on an operation screen for performing part maintenance, input to the effect that maintenance of a part has been performed, the format of which is not particularly limited. Here, when maintenance of a part has been performed, the processing advances to step S1502 and the CPU 238 performs a search as to whether or not the part whose maintenance has been performed in step S1501 is included in the image-diagnosis-target-part list 1201 in FIG. 12 described above, and the processing advances to step S1503. The processing advances to step S1504 if the CPU 238 determines in step S1503 that the part whose maintenance has been performed is included in the image-diagnosis-target-part list 1201, and the processing advances to step S1501 if the CPU 238 determines in step S1503 that the part is not included in the image-diagnosis-target-part list 1201.

In step S1504, the CPU 238 specifies image-diagnosis items 1202 relating to the part whose maintenance has been performed from the image-diagnosis-target-part list 1201, and the processing advances to step S1505. In step S1505, the CPU 238 displays, on the display unit 241 of the inspection apparatus 109, a pop-up 1301 as illustrated in FIG. 13, for example, for recommending the user to perform image diagnosis. In the pop-up 1301 displayed here, the part and the diagnosis items specified in steps S1502 and S1504 and words recommending that the image-diagnosis items associated with the part be performed are displayed. For example, in the example in FIG. 13, because the user has replaced the "fixing unit", the user is prompted to execute diagnosis of blemishes (streaks) and blemishes (spots), which are image-diagnosis items associated with the fixing unit.

Note that, while the pop-up 1301, which is an image-diagnosis recommendation screen, is displayed when maintenance of predetermined parts has been performed by the user in the second embodiment, the condition for displaying this screen is not limited to this. For example, in order to allow the user to check, prior to job execution, whether or not a change in device state over time has affected products, a configuration may be adopted such that this pop-up 1301 is displayed in a case in which printing has not been performed by the printing apparatus 107 for a predetermined period of time.

Next, advancing to step S1506, the CPU 238 determines whether the user has pressed the "close" button 1306 on the pop-up 1301, and, when the "close" button 1306 is pressed, the processing advances to step S1509 to close the pop-up 1301, and the CPU 238 terminates this processing. On the other hand, if the "close" button 1306 is not pressed in step S1506, the processing advances to step S1507, and if the "execute immediately" button 1305 is pressed in step S1507, the processing advances to step S1508 so that the CPU 238 instructs the printing apparatus 107 to execute the image-diagnosis items specified in step S1504, then the processing advances to step S1509 to close the pop-up 1301, and the CPU 238 terminates this processing.

As described above, according to the second embodiment, in a case in which the user has performed maintenance work such as replacement of a part of the image forming apparatus 101, the user can be prompted to execute image diagnosis processing corresponding to the part prior to job execution. Furthermore, a recommendation to execute image diagnosis can be provided to the user even if daily maintenance work other than maintenance work that becomes necessary in a case such as when product-inspection results based on product-inspection processing are NG has been performed.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-156464, filed Sep. 29, 2022, which is hereby incorporated by reference herein in its entirety.

What is claimed is:

1. An inspection system comprising:
a printing apparatus; and
an inspection apparatus that inspects a printed matter printed by the printing apparatus,
wherein the inspection apparatus includes one or more controllers including one or more processors and one or more memories, the one or more controllers configured to:
obtain a scanned image obtained by reading an image formed on the printed matter;
diagnose the printing apparatus based on the scanned image;
display, on a display, a screen including information indicating (i) one or more defects, (ii) respective operations for resolving the one or more defects, and (iii) that at least one of the respective operations has not been completed together with a content for instructing to execute a diagnosis of the printing apparatus that is not able to be selected; and
in a case where the respective operations for resolving the one or more defects have been completed, update the screen displayed on the display to include information indicating that respective operations for resolving the one or more defects have been completed together with the content for instructing to execute the diagnosis of the printing apparatus that is able to be selected.

2. The inspection system according to claim 1, wherein, in the diagnosis, the one or more controllers are configured to:

determine whether or not an image defect is present in the printed matter based on the scanned image and a reference image and determine the image defect as a defect;

identify a cause of the defect; and specify the respective operation for resolving the defect based on the identified cause.

3. The inspection system according to claim 2, wherein, in the specifying of the respective operation, the one or more controllers are configured to specify the respective operation for resolving the defect by referring to a table storing the cause of the defect and the respective operation corresponding to the cause.

4. The inspection system according to claim 1, wherein the one or more controllers are further configured to set a diagnosis target on which the diagnosis of the printing apparatus is to be executed in a case in which the content is selected on the updated screen.

5. The inspection system according to claim 4, wherein the setting of the diagnosis target includes setting whether a diagnosis target associated with the respective operation is to be set as the diagnosis target or a diagnosis target that is the same as a diagnosis target in a previous diagnosis is to be set as the diagnosis target.

6. The inspection system according to claim 4, wherein the one or more controllers are further configured to set whether to execute the re-diagnosis or to perform display for accepting the setting of the diagnosis target in a case in which the content is selected on the updated screen.

7. The inspection system according to claim 4, wherein, in the setting of the diagnosis target, the one or more controllers are configured to display a state in which the diagnosis target set in the previous diagnosis is selected in advance.

8. The inspection system according to claim 4, wherein the diagnosis target includes at least one of blemishes and displacement in a color in which the printing apparatus can perform printing.

9. The inspection system according to claim 1, wherein, upon displaying the updated screen, the one or more controllers are configured to determine whether the respective operation has been executed in the printing apparatus based on information from the printing apparatus or an instruction from a user having executed the respective operation.

10. The inspection system according to claim 1, wherein, upon displaying the updated screen, the one or more controllers are configured to further display, in accordance with the completion of the respective operation executed in the printing apparatus, a diagnosis item recommended as a target of the re-diagnosis.

11. The inspection system according to claim 10,
wherein the respective operation includes a replacement of a part of the printing apparatus,
the inspection system further comprises a storage that stores a table in which the part and a target of diagnosis are associated with one another, and
in the display of the recommended diagnosis item, the one or more controllers are configured to display the recommended diagnosis item by referring to the table.

12. The inspection system according to claim 1, wherein, in accordance with an instruction from the inspection apparatus, the printing apparatus generates and outputs the printed matter by printing a test chart on a designated sheet.

13. An inspection apparatus that inspects a printed matter printed by a printing apparatus, the inspection apparatus comprising one or more controllers including one or more processors and one or more memories, the one or more controllers configured to:
obtain a scanned image obtained by reading an image formed on the printed matter;
diagnose the printing apparatus based on the scanned image;
display, on a display, a screen including information indicating (i) one or more defects, (ii) respective operations for resolving the one or more defects, and (iii) that at least one of the respective operations has not been completed together with a content for instructing to execute a diagnosis of the printing apparatus that is not able to be selected; and
in a case where the respective operations for resolving the one or more defects have been completed, update the screen displayed on the display to include information indicating that respective operations for resolving the one or more defects have been completed together with the content for instructing to execute the diagnosis of the printing apparatus that is able to be selected.

14. The inspection apparatus according to claim 13,
wherein, in the diagnosis, the one or more controllers are configured to:
determine whether or not an image defect is present in the printed matter based on the scanned image and a reference image and determine the image defect as a defect;
identify a cause of the defect; and
specify the respective operation for resolving the defect based on the identified cause.

15. The inspection apparatus according to claim 14, wherein, in the specifying of the respective operation, the one or more controllers are configured to specify the respective operation for resolving the defect by referring to a table storing the cause of the defect and the respective operation corresponding to the cause.

16. The inspection apparatus according to claim 13, wherein the one or more controllers are further configured to set a diagnosis target on which the diagnosis of the printing apparatus is to be executed in a case in which the content is selected on the updated screen.

17. A method of controlling an inspection apparatus that inspects a printed matter printed by a printing apparatus, the method comprising:
obtaining a scanned image obtained by reading an image formed on the printed matter;
diagnosing the printing apparatus based on the scanned image;
displaying, on a display, a screen including information indicating (i) one or more defects, (ii) respective operations for resolving the one or more defects, and (iii) that at least one of the respective operations has not been completed together with a content for instructing to execute a diagnosis of the printing apparatus that is not able to be selected; and
updating, in a case where the respective operations for resolving the one or more defects have been completed, the screen displayed on the display to include information indicating that respective operations for resolving the one or more defects have been completed together with the content for instructing to execute the diagnosis of the printing apparatus that is able to be selected.

* * * * *